United States Patent
Neyerlin et al.

(10) Patent No.: US 11,680,162 B2
(45) Date of Patent: Jun. 20, 2023

(54) COMPOSITIONS FOR ELECTROLYTE FUEL CELLS AND OTHER ELECTROCHEMICAL CONVERSION DEVICES

(71) Applicant: Alliance for Sustainable Energy, LLC, Golden, CO (US)

(72) Inventors: Kenneth Charles Neyerlin, Arvada, CO (US); Yawei Li, Taiyuan Shanxi (CN); Timothy Blair Van Cleve, Denver, CO (US)

(73) Assignee: Alliance for Sustainable Energy, LLC, Golden, CO (US)

(*) Notice: Subject to any disclaimer, the term of this patent is extended or adjusted under 35 U.S.C. 154(b) by 231 days.

(21) Appl. No.: 17/219,201

(22) Filed: Mar. 31, 2021

(65) Prior Publication Data

US 2021/0309845 A1 Oct. 7, 2021

Related U.S. Application Data

(60) Provisional application No. 63/003,463, filed on Apr. 1, 2020.

(51) Int. Cl.
*C08L 27/22* (2006.01)
*C08L 53/00* (2006.01)
*H01M 8/1027* (2016.01)
*H01M 8/1004* (2016.01)
*C08K 3/04* (2006.01)

(52) U.S. Cl.
CPC ........... *C08L 27/22* (2013.01); *C08K 3/04* (2013.01); *C08L 53/005* (2013.01); *H01M 8/1004* (2013.01); *H01M 8/1027* (2013.01); *C08K 2201/001* (2013.01)

(58) Field of Classification Search
CPC .......... H01M 8/1004; H01M 8/1027; C08L 27/22; C08L 53/005; C08K 3/04; C08K 2201/001
USPC ........................................... 429/492
See application file for complete search history.

(56) References Cited

U.S. PATENT DOCUMENTS

| | | | | |
|---|---|---|---|---|
| 10,428,185 B2* | 10/2019 | Bailey | ........ | C08G 81/025 |
| 2012/0108694 A1* | 5/2012 | Malet | ........ | C08L 87/005 |
| | | | | 264/234 |
| 2014/0024729 A1* | 1/2014 | Kim | ........ | C08J 5/22 |
| | | | | 525/332.9 |
| 2015/0010849 A1* | 1/2015 | Elabd | ........ | H01M 10/052 |
| | | | | 521/38 |
| 2017/0018801 A1* | 1/2017 | Grubbs | ........ | C08G 61/02 |
| 2019/0169420 A1* | 6/2019 | Yabu | ........ | C08J 7/06 |

(Continued)

OTHER PUBLICATIONS

Baker, D. et al., "Measurement of Oxygen Transport Resistance in PEM Fuel Cells by Limiting Current Methods," vol. 156, No. 9, 2009, 13 pages.

(Continued)

*Primary Examiner* — James M Erwin
(74) *Attorney, Agent, or Firm* — Michael A. McIntyre

(57) ABSTRACT

The present disclosure relates to a composition that includes a fluoropolymer, a polymerized ionic liquid block copolymer (PILBC), and a catalyst, where the fluoropolymer is configured to affect ionic mobility, and the PILBC is configured to affect a property of the catalyst. In some embodiments of the present disclosure, the property may include at least one of oxygen transport and/or an active site functionality of the catalyst.

21 Claims, 19 Drawing Sheets

(56) References Cited

U.S. PATENT DOCUMENTS

2019/0326579 A1* 10/2019 Ryu .................... H01M 50/451
2020/0280095 A1* 9/2020 Chiefari ................ C08F 293/00

OTHER PUBLICATIONS

Benn, E. et al., "Characterization of Nanoporous Metal-Ionic Liquid Composites for the Electrochemical Oxygen Reduction Reaction," Journal of the Electrochemical Society, vol. 162, No. 10, 2015, 8 pages.

Dudenas, P.T. et al., "Evolution of Ionomer Morphology from Dispersion to Film: An in Situ X-ray study," Macromolecules, vol. 52, 2019, 7 pages.

George, M. et al., "Effect of Ionic Liquid Modification on the ORR Performance and Degradation Mechanism of Trimetallic PtNiMo/C Catalysts," ACS Catalysis, vol. 9, 2019, 11 pages.

Jangu, C. et al., "Well-Defined Imidazolium ABA Triblock Copolymers as Ionic-Liquid-Containing Electroactive Membranes," Macromolecular Chemistry and Physics, vol. 215, 2014, 13 pages.

Kabir, S. et al., "Elucidating the Dynamic Nature of Fuel Cell Electrodes as a Function of Conditioning: An ex Situ Material Characterization and in Situ Electrochemical Diagnostic Study," ACS Applied Materials & Interfaces, vol. 11, 2019, 15 pages.

Khan, A. et al., "Oxygen Reduction Reaction in Ionic Liquids: Fundamentals and Applications in Energy and Sensors," ACS Sustainable Chemistry & Engineering, vol. 5, 2017, 18 pages.

Lee, J-W. et al., "Electroactive nanostructured polymer actuators fabricated using sulfonated styrenic pentablock copolymer/montmorillonite/ionic liquid nanocomposite membranes," Japanese Journal of Applied Physics, vol. 53, 08NC03, 2014, 6 pages.

Li, Y. et al., "Sequential Capacitive Deposition of Ionic Liquids for Conformal Thin Film Coatings on Oxygen Reduction Reaction Electrocatalysts," ACS Catalysis, vol. 9, 2019, 6 pages.

Martinaiou, I. et al., "Improved electrochemical performance of Fe—N—C catalysts through ionic liquid modification in alkaline media," Journal of Power Sources, vol. 375, 2018, 11 pages.

Meek, K. et al., "Sulfonated Polymerized Ionic Liquid Block Copolymers," Macromolecular Rapid Communications, vol. 37, 2016, 7 pages.

Nykaza, J. R. et al., "Polymerized ionic liquid diblock copolymer as an ionomer and anion exchange membrane for alkaline fuel cells," Chemical Engineering Science, vol. 154, 2016, 9 pages.

Nykaza, J. R. et al., "Effect of alkaline exchange polymerized ionic liquid block copolymer ionomers on the kinetics of fuel cell half reactions," Journal of Electroanalytical Chemistry, vol. 783, 2016, 6 pages.

Qiao, M. et al., "Oxygenophilic ionic liquids promote the oxygen reduction reaction in Pt-free carbon electrocatalysts," RSC Materials Horizons Communication, vol. 4, 2017, 5 pages.

Qiao, M. et al., "Boosting the Oxygen Reduction Electrocatalytic Performance of Nonprecious Metal Nanocarbons via Triple Boundary Engineering Using Protic Ionic Liquids," ACS Applied Materials & Interfaces, vol. 11, 2019, 3 pages.

Shinozaki, K. et al., "Suppression of oxygen reduction reaction activity on Pt-based electrocatalysts from ionomer incorporation," Journal of Power Sources, vol. 325, 2016, 7 pages.

Subbaraman, R. et al., "Three Phase Interfaces at Electrified Metal-Solid Electrolyte Systems 1. Study of the Pt(hkl)-Nafion Interface," Journal of Physical Chemistry C, vol. 114, 2010, 9 pages.

Sun, R. et al., "121d-Proton Conducting Sulfonated Poly(ionic liquid) Block Copolymers," Abstract, 2019 AIChE Annual Meeting, 3 pages.

Sun, R. et al., "Synthesis and High Alkaline Chemical Stability of Polyionic Liquids with Methylpyrrolidinium, Methylpeperidinium, Methylazepanium, Methylazocanium, and Methylazonanium Cations," ACS Macro Letters, vol. 8, 2019, 6 pages.

Van Cleve, T. et al., "Dictrating Pt-Based Electrocatalyst Performance in Polymer Electrolyte Fuel Cells, from Formulation to Application," ACS Applied Materials & Interfaces, vol. 11, 2019, 12 pages.

Wang, M. et al., "Ionic Liquid-Modified Microporous ZnCoNC-Based Electrocatalysts for Polymer Electrolyte Fuel Cells," ACS Energy Letters, vol. 4, 2019, 7 pages.

Woo, E. et al., "Polyimide-PEG Segmented Block Copolymer Membranes with High Proton Conductivity by Improving Bicontinuous Nanostructure of Ionic Liquid-Doped Films," Macromolecular Chemistry and Physics, vol. 220, 2019, 8 pages.

Tymoczko, J. et al., "Oxygen Reduction at a Cu-Modified Pt(111) Model Electrocatalyst in Contact with Nation Polymer," ACS Catalysis, vol. 4, 2014, 7 pages.

Zakeri, M. et al., "Preparation and characterization of highly stable protic-ionic-liquid membranes," International Journal of Hydrogen Energy, vol. 44, 2019, 11 pages.

Huang, K. et al., "Enhancing Pt/C Catalysts for the Oxygen Reduction Reaction with Protic Ionic Liquids: The Effect of Anion Structure," Journal of the Electrochemical Society, vol. 164, No. 13, 12 pages.

Li, Y. et al., "Modifying the Electrocatalyst-Ionomer Interface via Sulfonated Poly(ionic liquid) Block Copolymers to Enable High-Performance Polymer Electrolyte Fuel Cells," ACS Energy Letters, vol. 5, 2020, 6 pages.

* cited by examiner

COMPOSITIONS FOR ELECTROLYTE FUEL CELLS AND OTHER ELECTROCHEMICAL CONVERSION DEVICES

CROSS-REFERENCE TO RELATED APPLICATIONS

This application claims priority from U.S. Provisional Patent Application No. 63/003,463 filed on Apr. 1, 2020, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

BACKGROUND

Polymer electrolyte membrane (PEM) fuel cells are well-suited for market applications as power supplies for electric vehicles because of their high electrical efficiencies, relatively low operating temperature, and lack of harmful exhaust. To date, however, further commercial viability and greater market penetration is restrained by requisite platinum-group-metal (PGM) loadings, which directly affect the cost of PEM fuel cells. Sluggish cathode oxygen reduction reaction (ORR) kinetics remains a major limitation engendering higher platinum (Pt) content at the cathode. Thus, there remains a need for improved compositions for PEM cells, to better position PEM fuel in the marketplace so that they can realize their full impact on minimizing our reliance on fossil-fuels.

SUMMARY

An aspect of the present disclosure is a composition that includes a fluoropolymer, a polymerized ionic liquid block copolymer (PILBC), and a catalyst, where the fluoropolymer is configured to affect ionic mobility, and the PILBC is configured to affect a property of the catalyst. In some embodiments of the present disclosure, the property may include at least one of oxygen transport and/or an active site functionality of the catalyst.

In some embodiments of the present disclosure, the fluoropolymer may include at least one of polyvinylfluoride, polyvinylidene fluoride, polytetrafluoroethylene, polychlorotrifluoroethylene, a perfluoroalkoxy polymer, fluorinated ethylene-propylene, polyethylenetetrafluoroethylene, polyethylenechlorotrifluoroethylene, chlorotrifluoroethylenevinylidene fluoride, tetrafluoroethylene-propylene, perfluoropolyether, and/or perfluorosulfonic acid.

In some embodiments of the present disclosure, the fluoropolymer may have the structure

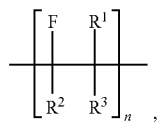

where each of $R^1$, $R^2$, and $R^3$ may include at least one of a hydrogen atom, a fluorine atom, a trifluoromethyl group, and/or a sulfonic acid group, and where $1<n<10,000$.

In some embodiments of the present disclosure, the fluoropolymer may include at least one of

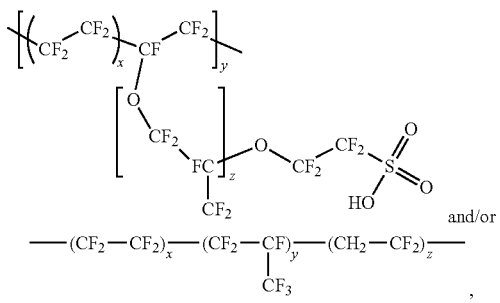

and/or where $1<x<10,000$, $1<y<10,000$, and $1<z<10,000$.

In some embodiments of the present disclosure, the PILBCP may include at least one a first repeat unit and/or a second repeat unit, where the first repeat unit may be defined by

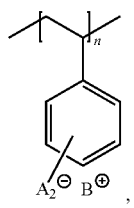

the second repeat unit may be defined by

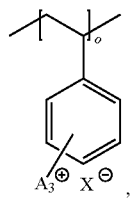

$A_2$ may be a first ionic functional group paired with a first counter ion ($B^+$), $A_3$ may be a second ionic functional group paired with a second counter ion ($X^-$), $1 \le n \le 1{,}000$, and $1 \le o \le 1{,}000$.

In some embodiments of the present disclosure, the PILBCP may further include a third repeat unit defined by where $A_1$ may be a neutral functional group having at least one of a hydrocarbon chain and/or an aromatic, and $1 \le m \le 1{,}000$. In some embodiments of the present disclosure, $A_2^-$ may include a sulfonic group ($-SO_3^-$). In some embodiments of the present disclosure, $B^+$ may include a Group I element. In some embodiments of the present disclosure, $B^+$ may include at least one of $H^+$ and/or $Li^+$. In some embodiments of the present disclosure, $A_3$ may include a nitrogen atom.

In some embodiments of the present disclosure, $A_3^+$ may include at least one of

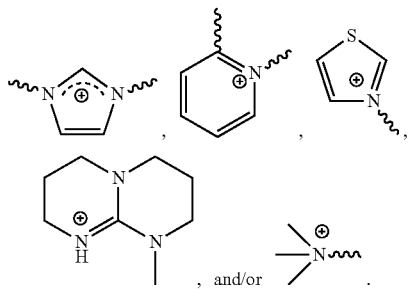

In some embodiments of the present disclosure, $A_3^+$ may include at least one of

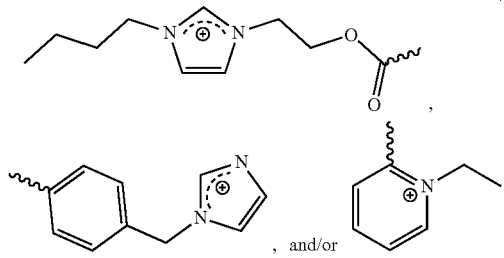

In some embodiments of the present disclosure, $X^-$ may include at least one of

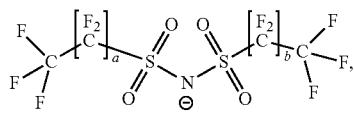

$BF_4^-$, or $PF_6^-$, $1 \leq a \leq 10$, and $1 \leq a \leq 10$. In some embodiments of the present disclosure, X− may include

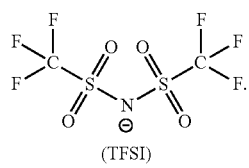

(TFSI)

In some embodiments of the present disclosure, the PILBC may include at least one of

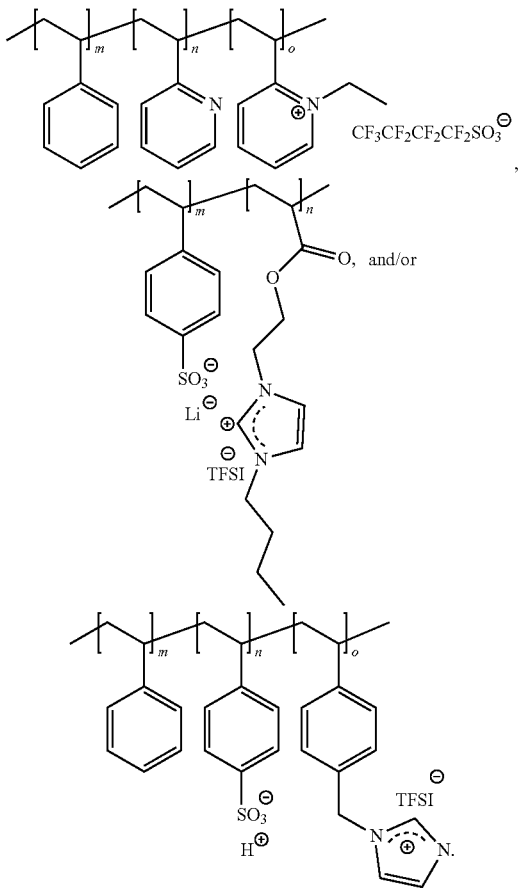

In some embodiments of the present disclosure, the composition may further include a conductive carbon. In some embodiments of the present disclosure, the conductive carbon may include at least on of carbon black, Vulcan™, acetylene black, graphite, Ketjenblack, oxidized acetylene black, and/or any other suitable furnace black. In some embodiments of the present disclosure, the fluoropolymer and the PILBC may be present at a first mass ratio between about 1:10 and about 10:1. In some embodiments of the present disclosure, the fluoropolymer and the catalyst may be present at a second mass ratio between about 1:10 and about 20:1. In some embodiments of the present disclosure, the fluoropolymer and the conductive carbon may be present at a third mass ratio between about 1:10 and about 1:1.

BRIEF DESCRIPTION OF THE DRAWINGS

Some embodiments are illustrated in referenced figures of the drawings. It is intended that the embodiments and figures disclosed herein are to be considered illustrative rather than limiting.

DETAILED DESCRIPTION

Figure 1A:
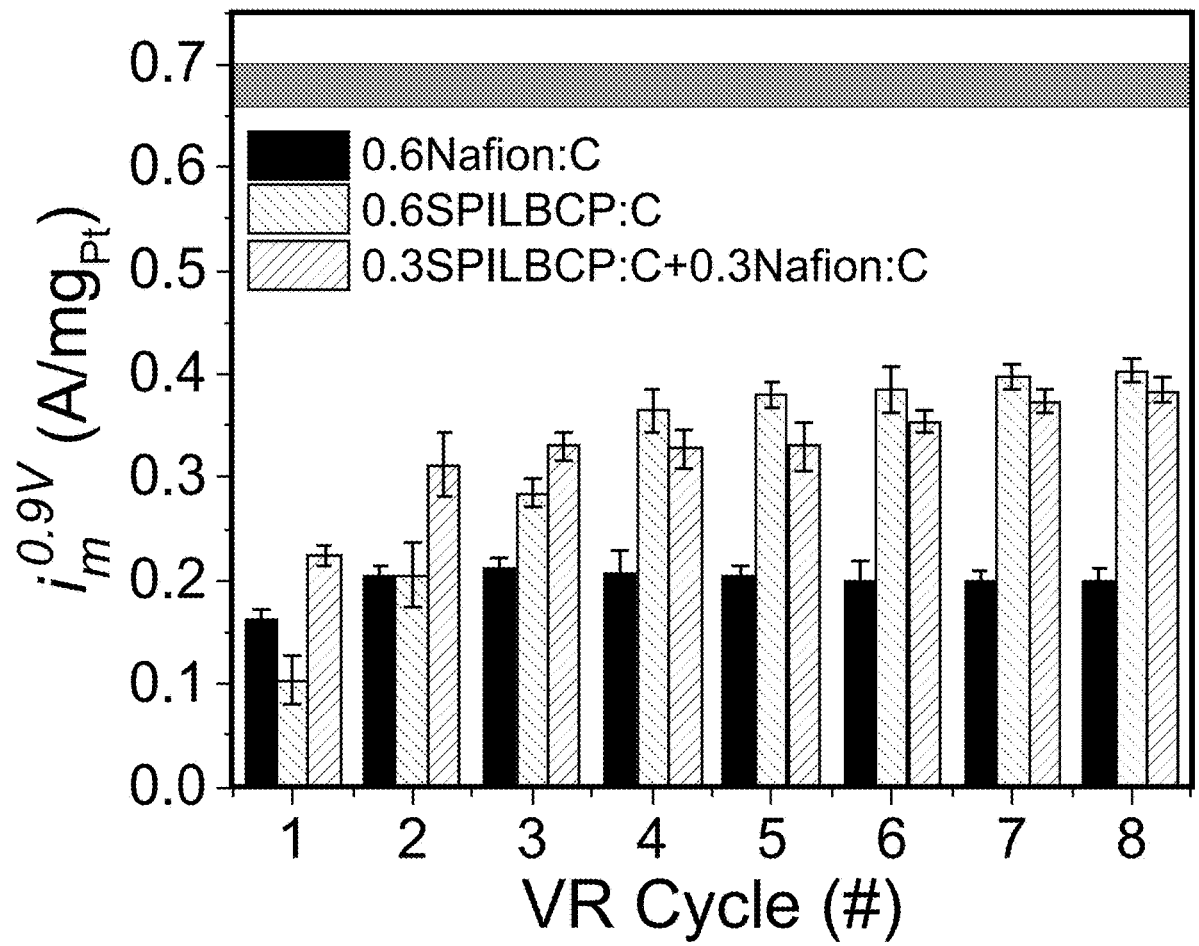
FIG. 1A illustrates the mass-based ($i_m^{0.9V}$) performance of fully conditioned Pt/Vu membrane electrode assemblies (MEAs) from $H_2/O_2$ performance at ~150 kPa, ~80° C., and 100% relative humidity (RH), according to some embodiments of the present disclosure. Horizontal bars represent reported rotating disk electrode (RDE) values of mass-activity (MA) and specific-activity (SA) for Nafion-free Pt/Vu systems. All error bars correspond to the standard deviation from at least two experiments.

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

Among other things, the present disclosure relates to novel compositions which may be incorporated into electrodes used in fuel cells and/or other electrochemical devices and/or systems. As described herein, in some embodiments of the present disclosure, two different materials (e.g., Nafion and a sulfonated polymerized ionic liquid block copolymer (sulfonated-PILBCP) may be combined to form compositions which may be subsequently incorporated into an electrode. As shown herein, such compositions can improve the overall performance of fuel cells. For the specific example of a composition that includes Nafion mixed with a sulfonated-PILBCP (SPILBCP), the SPILBCP may enhance a kinetic performance characteristic, while Nafion may enhance a transport characteristic of gas and/or ions. The results shown herein suggest that such compositions may provide a promising strategy to enhance device-level performance of fuel cells, electrolyzers, and/or other electrochemical conversion devices by engineering compositions that leverage the desirable properties of the individual materials and/or components of the compositions.

In some embodiments of the present disclosure, a mixture and/or composition may include a first material configured to affect ionic mobility, and a second material configured to affect a property of a catalyst. In some embodiments of the present disclosure, the first material of the composition (affecting ionic mobility) may include a polymer such as a fluoropolymer. Examples of fluoropolymers that fall within the scope of the present disclosure include polyvinylfluoride, polyvinylidene fluoride, polytetrafluoroethylene, polychlorotrifluoroethylene, a perfluoroalkoxy polymer, fluorinated ethylene-propylene, polyethylenetetrafluoroethylene, polyethylenechlorotrifluoroethylene, chlorotrifluoroethylenevinylidene fluoride, tetrafluoroethylene-propylene, perfluoropolyether, and/or perfluorosulfonic acid (i.e. Nafion).

Structures of fluoropolymers according to some embodiments of the present disclosure are summarized in Scheme 1 below.

Scheme 1

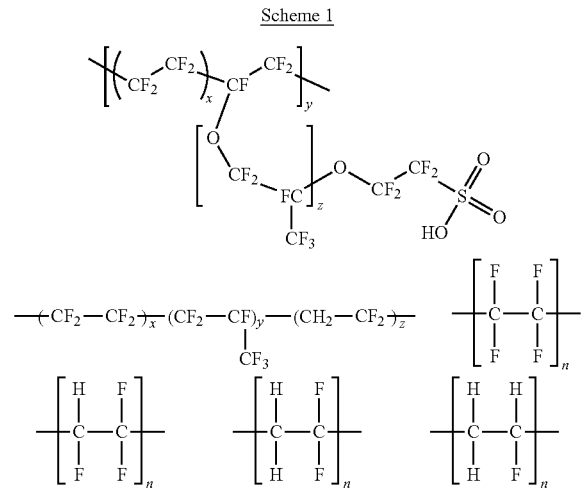

In some embodiments of the present disclosure, a fluoropolymer may have a structure described by

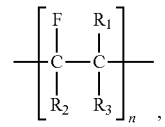

where each of $R_1$, $R_2$, and $R_3$ may include at least one of a hydrogen atom, a fluorine atom, a trifluoromethyl group, and/or a sulfonic acid group, and 1<n<10,000.

In some embodiments of the present disclosure, the second material of the composition (affecting a catalyst property) may include a polymer such as a PILBC. For the example of a PILBC, in some embodiments of the present disclosure, a PILBC may include a first repeat unit having a structure defined by

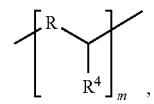

where R is a first linking group that may include at least one of between 1 and 10 —$CH_2$— groups and/or between 1 and 10 —$CF_2$— groups, $R^4$ may include at least one of a hydrogen atom and/or an aromatic functional group, and 1≤m≤1,000. In some embodiments of the present disclosure, $R^4$ may include an aromatic, six-membered ring, with specific examples including benzene, naphthalene, and/or anthracene. In some embodiments of the present disclosure, an aromatic ring may include at least one nitrogen atom, with specific examples including at least one of pyridine, quinoline, isoquinoline, pyrazine, pyrimidine, pyridazine, and/or 1,2,3-triazine. In general, $R^4$ is not charged (i.e., not ionic).

In some embodiments of the present disclosure, a PILBC may include a second repeat unit having a structure defined by

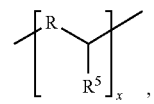

where R is a second linking group that may include at least one of between 1 and 10 —$CH_2$— groups and/or between 1 and 10 —$CF_2$— groups, $R^5$ may include a first ionic functional group charge balanced with a first counter ion, and 1≤x≤1,000. In some embodiments of the present disclosure, the first ionic functional group may include an acidic functional group, such as at least one of a sulfonate group, a sulfonic acid group, a phosphoric acid group, and/or a carboxylic acid. In some embodiments of the present disclosure, a first ionic functional group may further include a third linking group, including at least one of —O—, —CO—, —$CH_2$—, and/or —$CF_2$—. In some embodiments of the present disclosure, a first ionic functional group may include an aromatic, six-membered ring, with specific examples including benzene, naphthalene, and/or anthracene. In some embodiments of the present disclosure, an aromatic ring may include at least one nitrogen atom, with specific examples including at least one of pyridine, quinoline, isoquinoline, pyrazine, pyrimidine, pyridazine, and/or 1,2,3-triazine. In some embodiments of the present disclosure, the first counter ion that balances the charge with the first ionic functional group, may include at least one of $H^+$, $Na^+$, $Li^+$, and/or $K^+$.

In some embodiments of the present disclosure, a PILBC may include a third repeat unit having a structure defined by

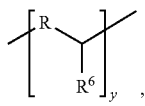

where R is a third linking group that may include at least one of between 1 and 10 —$CH_2$— groups and/or between 1 and 10 —$CF_2$— groups, $R^6$ may include a second ionic functional group charge balanced with a second counter ion, and where $1 \leq y \leq 1{,}000$. In some embodiments of the present disclosure, a second ionic functional group may include an atom having a positive charge, where the atom may include at least one of nitrogen, sulfur, and/or phosphorus.

Thus, as described herein, a PILBC may be include one, two, and/or three repeat units having the structures illustrated in Scheme 2 below.

Scheme 2

1
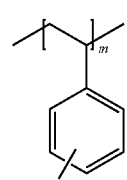

2
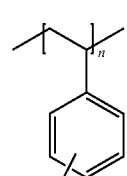

3
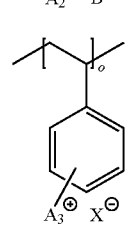

In Scheme 2, a first repeat unit (#1) may include a benzene functional group having a neutral group, $A_1$. A second repeat unit (#2) may include a benzene functional group having a first ionic functional group charge, $A_2^-$, balanced with a first counter ion $B^+$. A third repeat unit (#3) may include a benzene functional group having a second ionic functional group charge, $A_3^+$, balanced with a second counter ion $X^-$. In some embodiments of the present disclosure, $1 \leq m \leq 1{,}000$, $1 \leq n \leq 1{,}000$, and/or $1 \leq o \leq 1{,}000$ Scheme 3 below illustrates some nitrogen-containing structures that may be included in an ionic functional group, $A_3$, for a third repeat unit (#3 above) of a PILBC, according to some embodiments of the present disclosure. As defined herein, the symbol ⌇ represents a covalent bond to a neighboring structure, e.g., an ethylene repeat unit.

Scheme 3

4

5
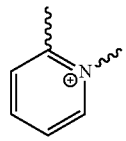

6
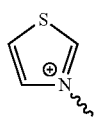

7
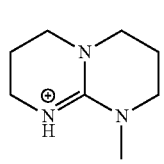

8

Scheme 4 below illustrates some examples of ionic functional groups, $A_3$, for a third repeat unit (#3 above) of a PILBC, according to some embodiments of the present disclosure.

Scheme 4

4-1
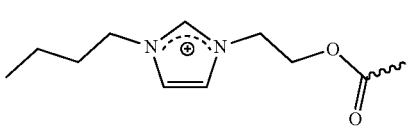

4-2

5-1
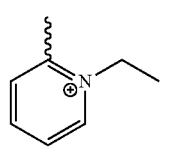

Examples of a counter ions, X, that may balance the charge with an ionic functional group, $A_3$, for a third repeat unit (#3 above) of a PILBC are summarized in Scheme 5 below, according to some embodiments of the present disclosure.

Scheme 5

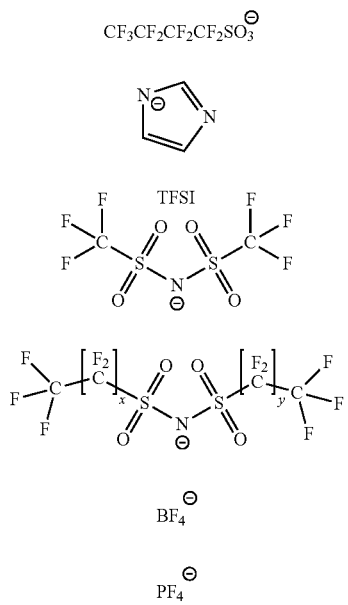

9 CF$_3$CF$_2$CF$_2$CF$_2$SO$_3^-$

10 (imidazole)

11 TFSI

12

13 BF$_4^-$

14 PF$_6^-$

Examples of counter ions, B, include Group I Elements such H$^+$ and/or Li$^+$.

Therefore, as described above, a second material of a composition (affecting a catalyst property; a PILBC) may include a structure as described by Structure #15 below. Specific examples are provided in Scheme 6 below.

Scheme 6

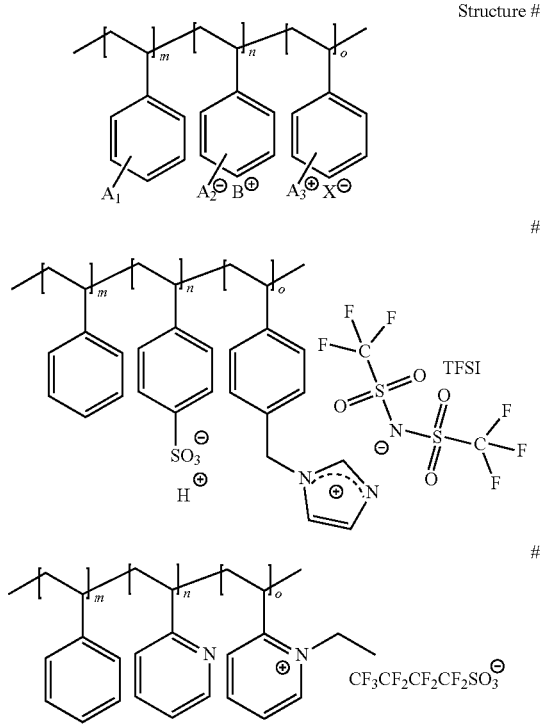

Structure #15

16

17

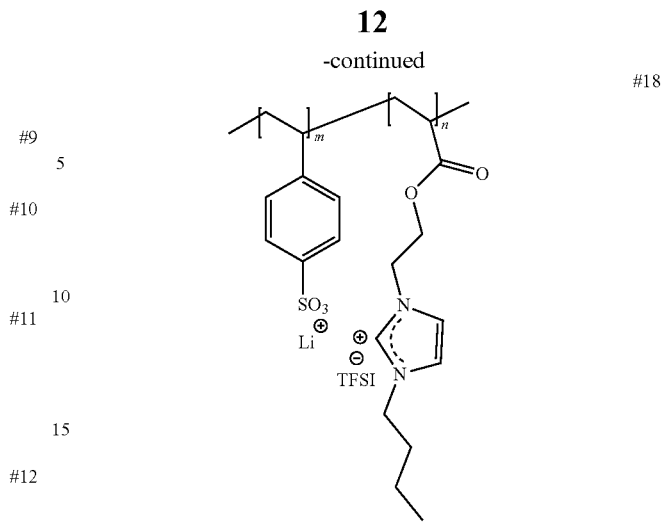

18

For the experimental work described below, Structure #16 shown in Scheme 6 was the exemplary sulfonated-PILBC tested.

In some embodiments of the present disclosure, the mixture and/or composition may further include a catalyst such as a transition metal with examples including cobalt, nickel, copper, and/or zinc. In some embodiments of the present disclosure, a catalyst may include a noble metal, for example platinum, palladium, rhodium, silver, gold, osmium, and/or iridium. In some embodiments of the present disclosure, a catalyst may include an alloy of a noble metal and at least one other transition metal, with examples including PtCo and/or PtNi.

In some embodiments of the present disclosure, the mixture and/or composition may further include a conductive carbon, with specific examples including at least one of carbon black, Vulcan™, acetylene black, graphite, Ketjenblack, oxidized acetylene black, and/or any other suitable furnace blacks. In some embodiments of the present disclosure, the first material and the second material may be present at a first mass ratio between 1:10 and 10:1. In some embodiments of the present disclosure, the first material and the catalyst may be present at a second mass ratio between 1:10 and 20:1. In some embodiments of the present disclosure, the first material and the conductive carbon may be present at a third mass ratio between 1:10 and 1:1.

Figure 1B:
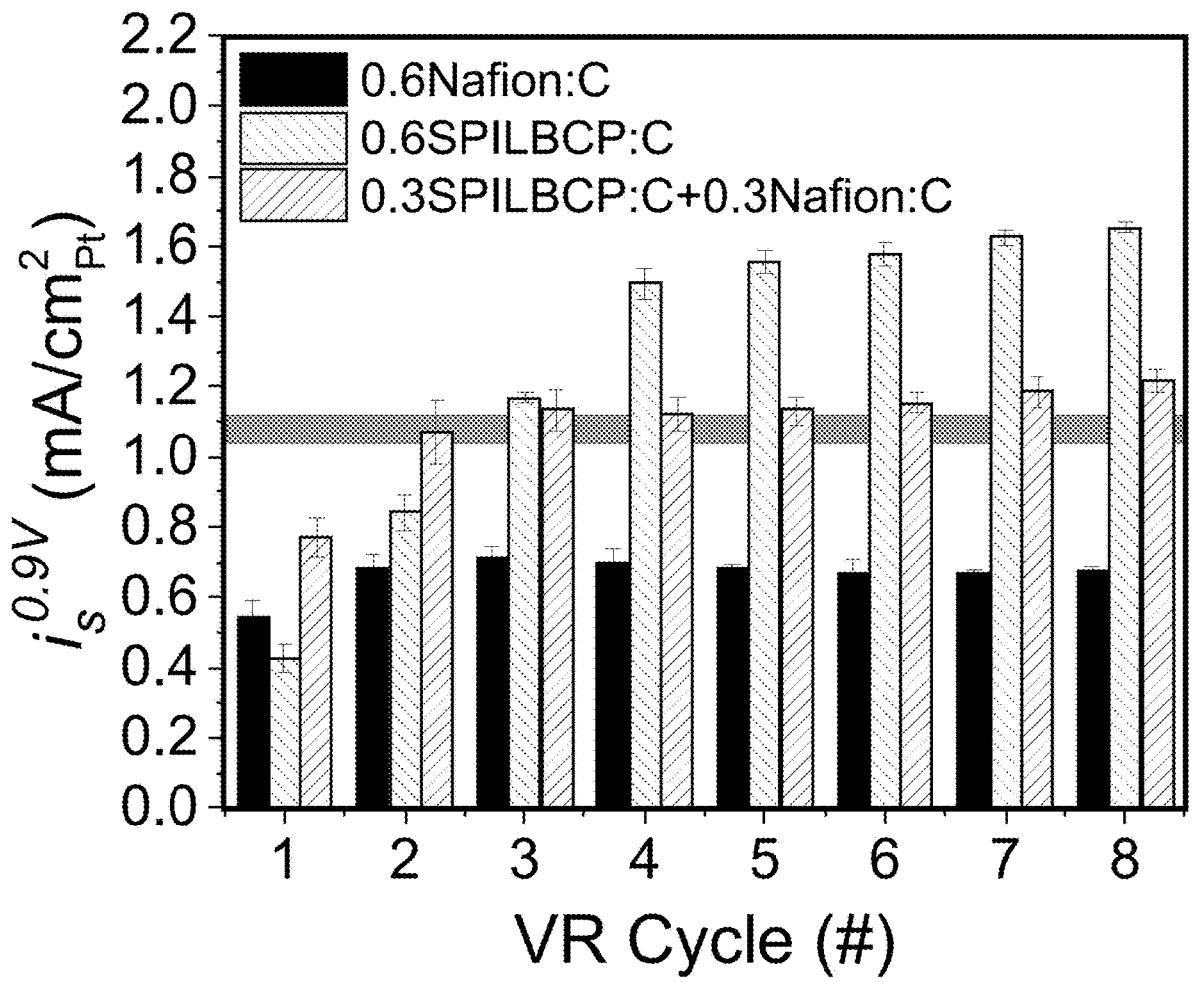
FIG. 1B illustrates the electrochemical active surface area (ECA)-based ($i_s^{0.9V}$) performance of fully conditioned Pt/Vu membrane electrode assemblies (MEAs) from $H_2/O_2$ performance at ~150 kPa, ~80° C., and 100% relative humidity (RH), according to some embodiments of the present disclosure. All error bars correspond to the standard deviation from at least two experiments.

Following below are experimental results of various compositions that include a first material and a second material as described above. FIGS. 1A and 1B show the improvement in both catalyst mass-based activity ($i_m^{0.9V}$) and ECA-based activity (specific activity—$i_s^{0.9V}$) determined at 0.9 V iR-free. As shown herein, "voltage recovery" (VR) cycles were employed to achieve optimal membrane electrode assembly (MEA) performance. Two to three VR cycles were required to reach peak mass activity with Nafion-containing MEAs. However, more VR cycles were required for SPILBCP incorporated samples to achieve peak power, something which may be related to near surface optimization of the electrocatalyst-ionomer interface and the additional hydration process within IL-functional group domains required to assist proton conductivity. (IL=ionic liquid)

Figure 2:
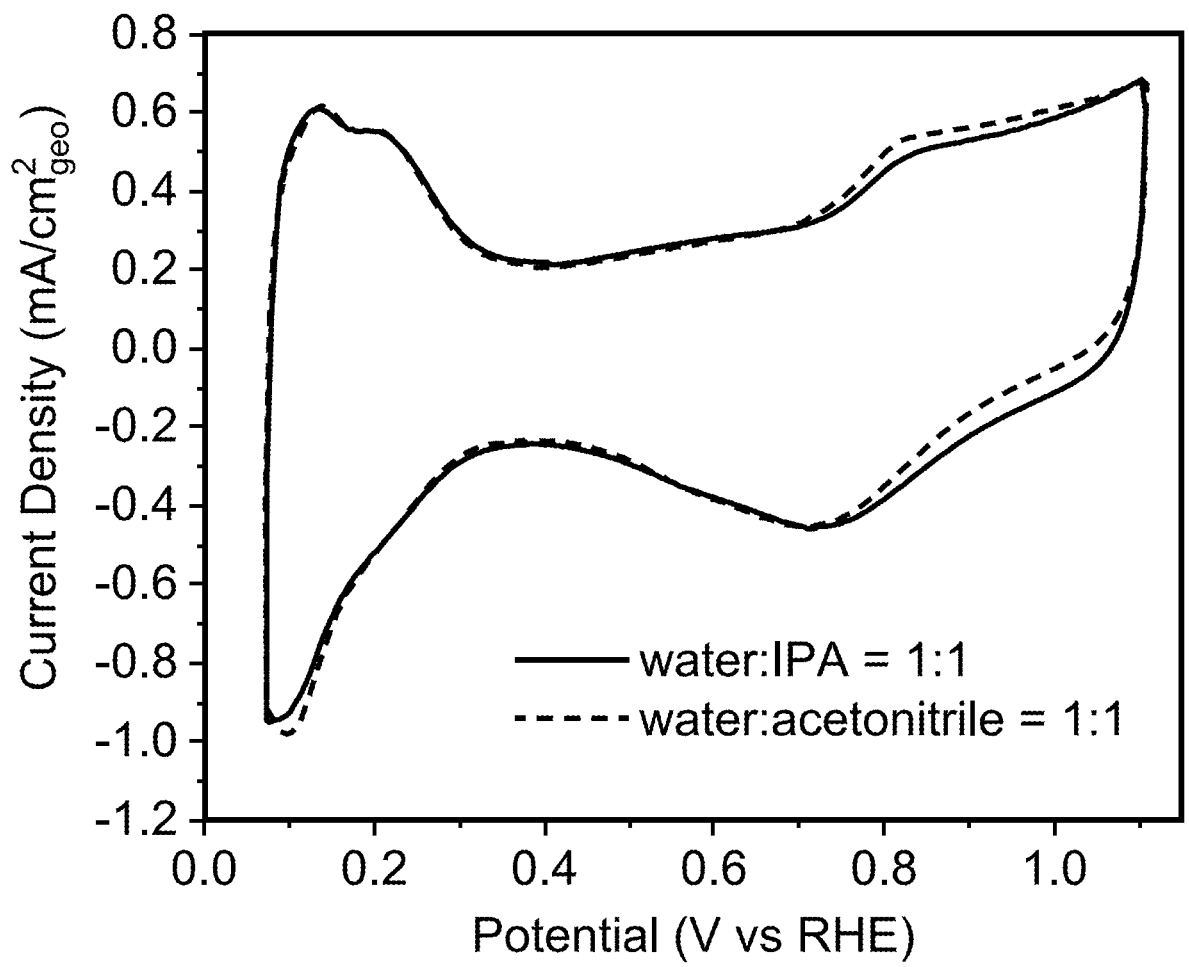
FIG. 2 illustrates cyclic voltammetry (CV) scans of Pt/Vu film prepared using ink solvent of water:iso-propanol (IPA) =1:1 (vol:vol) (solid line) and water:acetonitrile=1:1 (vol:vol) (dashed line) in the fresh electrolyte of 0.1 M $HClO_4$ under argon at ~50 $mV/cm^2$ after potential cycling of 0.05~1.2 V vs RHE for 50 cycles, according to some embodiments of the present disclosure.

Since SPILBCPs are not easily dispersed in alcohol-based solvents (e.g., n-propanol (NPA), IPA) commonly used for the catalyst suspensions, and the resulting ionomer film and electrode catalyst-ionomer microstructure is a strong function of ink formulation (as defined by components and compositions), an acetonitrile-based solvent mixture was used to fabricate the electrodes described herein. FIG. 2 shows a negligible difference in hydrogen adsorption/desorption features between electrodes deposited from IPA and acetonitrile-based catalyst inks, indicating the removal of adsorbed contaminant species after potential cycling. After some investigation into the effect of ink composition on particle aggregation, dynamic lighting scattering (DLS) revealed a mass-based ink composition of about 60% water and about 40% acetonitrile produced a minimum catalyst-ionomer particle aggregation for Pt/Vu electrocatalyst inks containing both Nafion and SPILBCP (see Table 1).

TABLE 1

$Z_{avg}$ diameter of dilute ionomer (~0.024 wt %) and catalyst (~0.1 wt %) + ionomer (~0.024 wt %) dispersions characterized by DLS. The ratios are mass based. w stands for water, and AcN stands by acetonitrile.

| Ink Materials | Ink Content(z-avg [nm]) | | | | |
|---|---|---|---|---|---|
| | 5:5-w:AcN | 6:4-w:AcN | 7:3-w:AcN | 8:2-w:AcN | 9:1-w:AcN |
| Nafion only | 308.9 ± 75.0 | 324.5 ± 61.1 | 453.1 ± 80.7 | 519.2 ± 56.1 | NA/>1000 |
| Pt/Vu + Nafion | 271.5 ± 5.1 | 272.2 ± 4.9 | 308.0 ± 7.1 | 284.4 ± 11.9 | 317.3 ± 9.1 |
| SPILBCP only | 52.30 ± 0.3 | 59.68 ± 0.2 | 71.25 ± 1.2 | 167.5 ± 4.3 | 144.2 ± 6.6 |
| Pt/Vu + SPILBCP | 271.6 ± 6.6 | 252.5 ± 2.7 | 293.7 ± 7.7 | 491.3 ± 3.7 | 573.4 ± 3.7 |

Figure 1C:
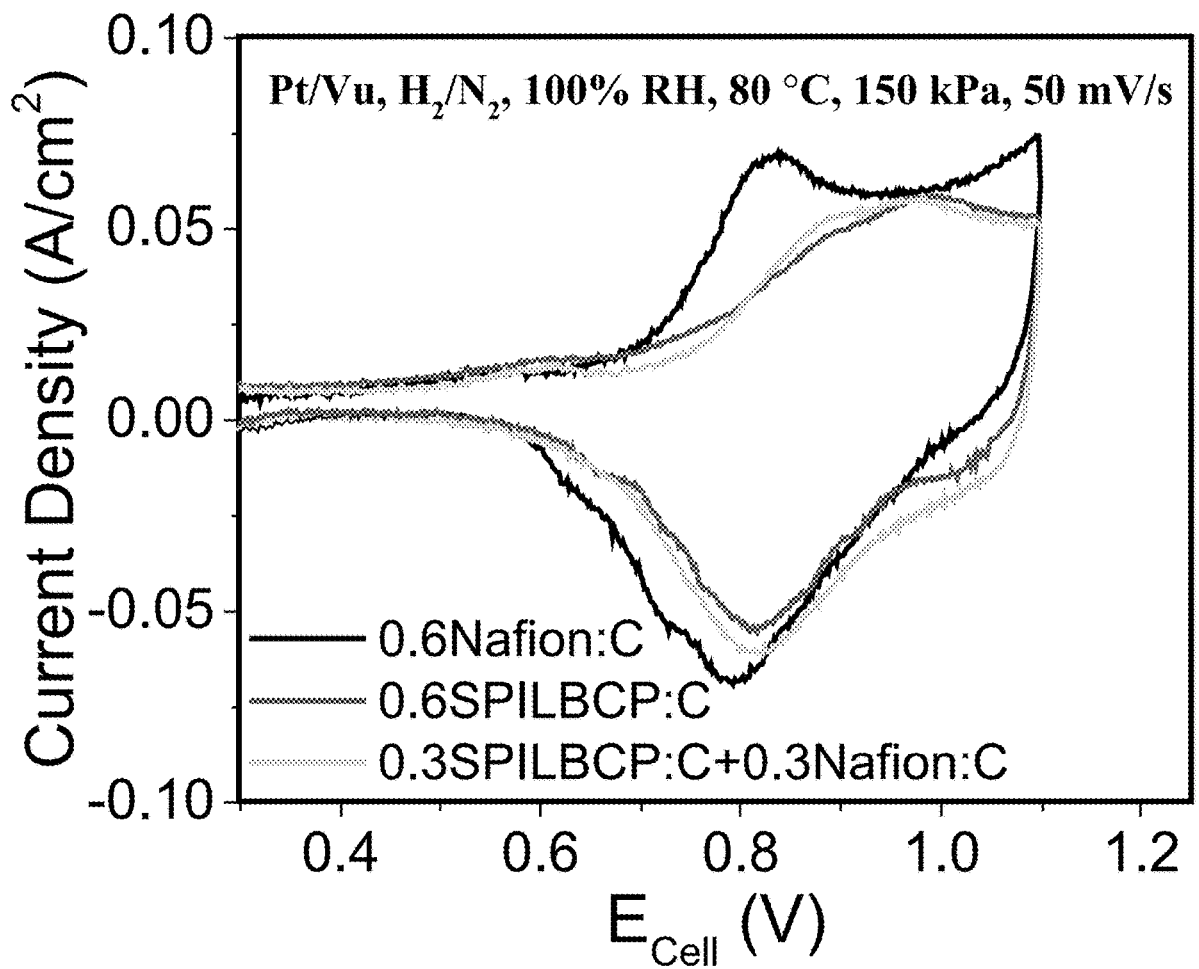
FIG. 1C illustrates the average $H_2/O_2$ performance data (~80° C., 100% RH, ~150 $kPa_{abs}$ total pressure) at peak performance of fully conditioned Pt/Vu membrane electrode assemblies (MEAs) from $H_2/O_2$ performance at ~150 kPa, ~80° C., and 100% relative humidity (RH), according to some embodiments of the present disclosure.
Figure 1D:
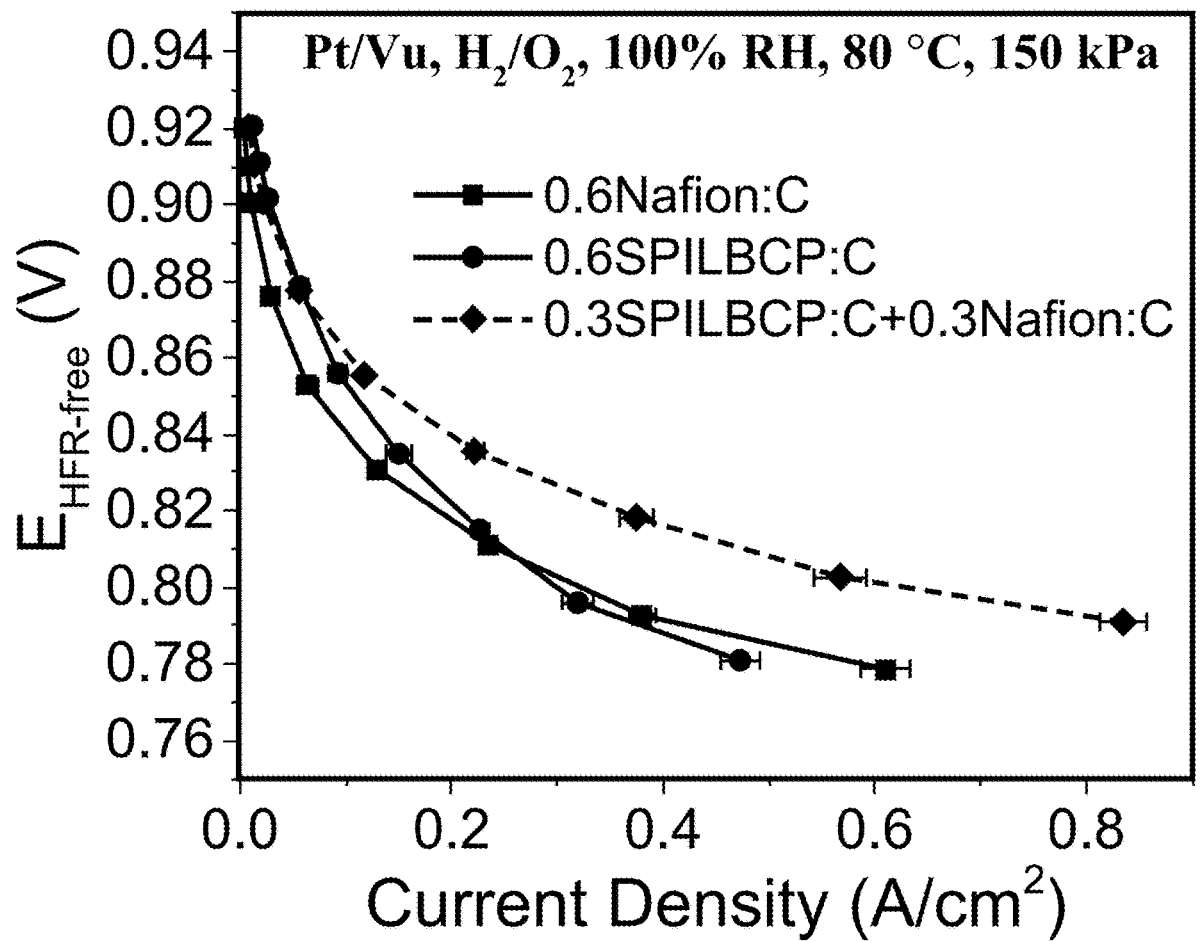
FIG. 1D illustrates the surface oxidation using cyclic voltammetry (~80° C., 100% RH, ~150 $kPa_{abs}$ total pressure) at ~50 mV/s obtained for low-loading Pt/Vu MEAs (~0.07 $mg_{Pt}$ $cm^{-2}$) of fully conditioned Pt/Vu membrane electrode assemblies (MEAs) from $H_2/O_2$ performance at ~150 kPa, ~80° C., and 100% relative humidity (RH), according to some embodiments of the present disclosure.

FIG. 1C summarizes the geometric performance of Pt/Vu catalyst coated membranes (CCMs) during $H_2/O_2$ polarization experiments at maximum performance after the application of VR cycles (three for Nafion only, and eight for the CCMs containing SPILBCPs). Of note, despite the change to an acetonitrile/water ink formulation, the Nafion based MEAs achieved a nearly identical mass activity to previously reported results for NPA/water based MEAs at an identical ionomer-to-carbon (I/C) ratio. However, when Nafion was replaced with SPILBCP, a significant performance increase was observed in the low current density (LCD) region (>0.8 $V_{RHE}$) resulting in improvements to both $i_m^{0.9V}$ and $i_s^{0.9V}$. As shown in FIGS. 1A and 1B, SPILBCP-containing CCMs (0.6SPILBCP:C) exhibit $i_m^{0.9V}$ and $i_s^{0.9V}$ approximately doubled those observed for Nafion-only CCMs (0.6Nafion:C). This result is a milestone for the PEMFC community as it is the first time that $i_s^{0.9V}$ values determined from an MEA were observed to be on par with prior RDE results for Nafion-free Pt/Vu systems (e.g. $i_s^{0.9V}$ ca. 1.05-1.12 mA/cm$^2_{Pt}$). Correlating with the increase in $i_s^{0.9V}$, FIG. 1D shows the suppression of surface oxidation for SPILBCP containing samples where the positive shifts in Pt oxidation peak potential (~0.8V$_{cell}$) are indicative of decreased coverage of oxide species. Despite possessing an improved kinetic performance, the geometric performance of the SPILBCP-only samples was overtaken by the Nafion-only samples at current densities above 0.3 A/cm$^2$ (see FIG. 1C), likely due to an increase in electrode proton resistance for the SPILBCP containing samples.

Figure 3A:
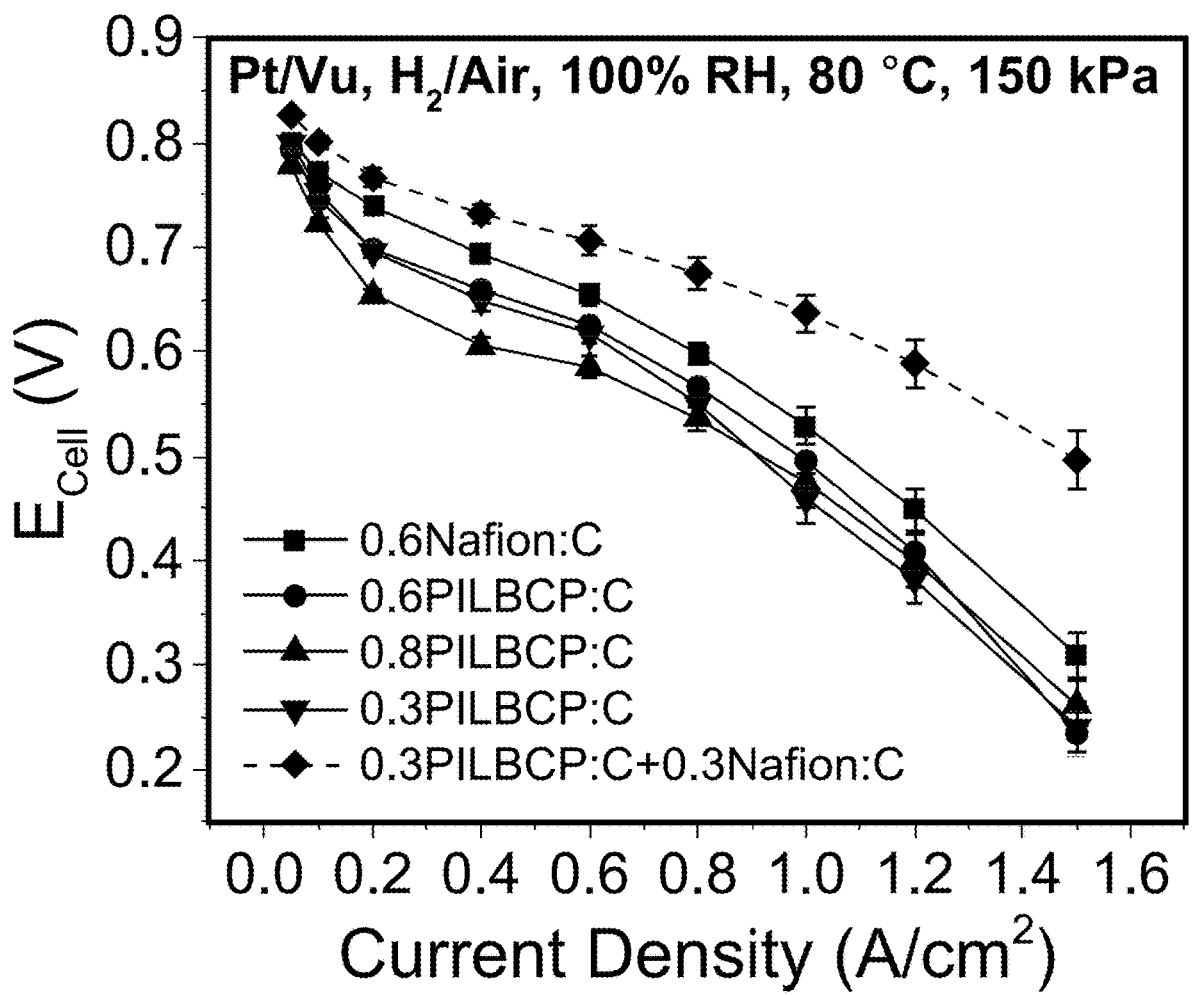
FIG. 3A illustrates the average $H_2$/Air performance data at ~80° C., ~150 kPa, and 100% RH of Pt/Vu MEAs, according to some embodiments of the present disclosure.
Figure 3B:
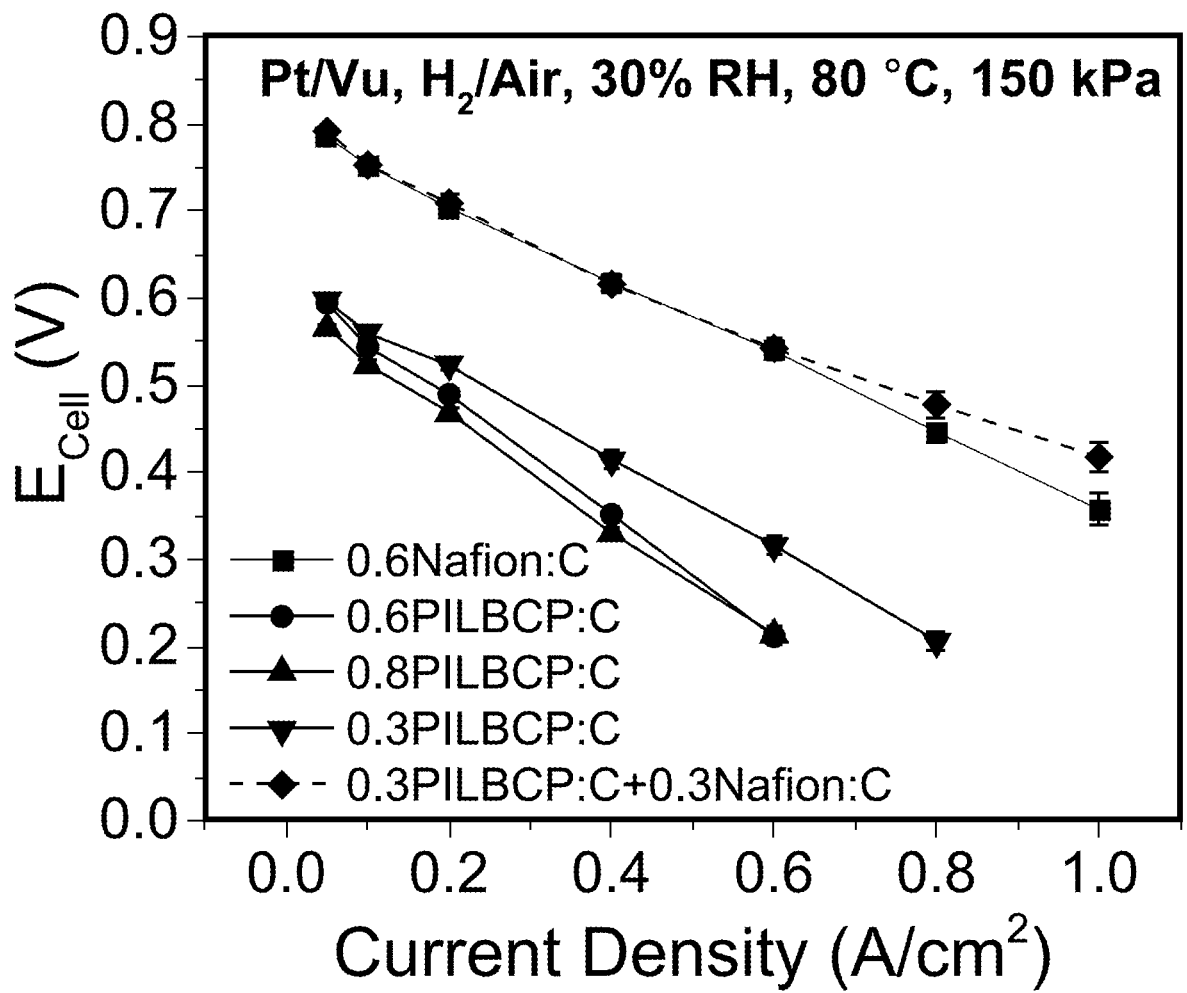
FIG. 3B illustrates the average $H_2$/Air performance data at ~80° C., ~150 kPa, and ~30% RH of Pt/Vu MEAs, according to some embodiments of the present disclosure.
Figure 3C:
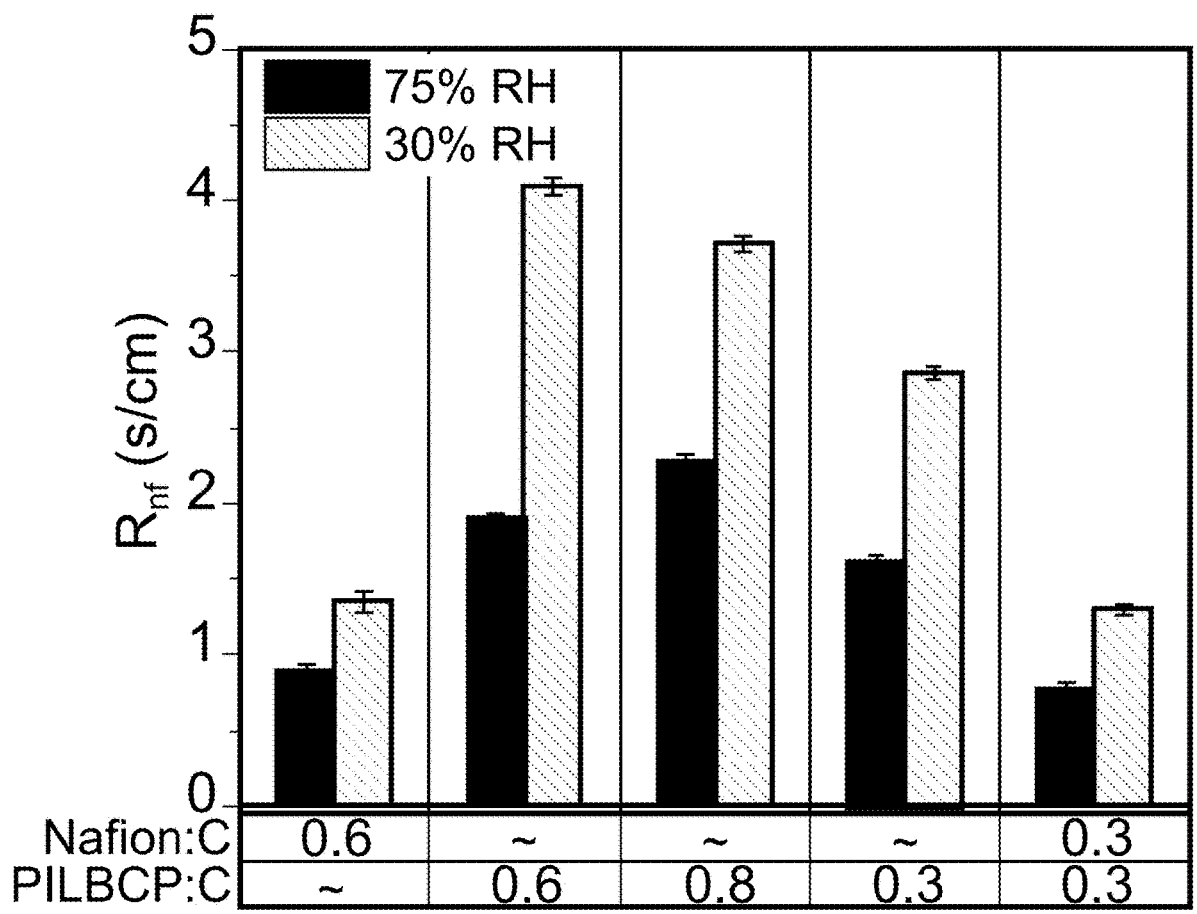
FIG. 3C illustrates the non-Fickian oxygen transport resistances, $R_{nF}$, for fully conditioned Pt/Vu MEAs (~0.07 $mg_{Pt}$ $cm^{-2}$) determined by limiting current experiments using ~5 $cm^2$ differential cells, according to some embodiments of the present disclosure.
Figure 3D:
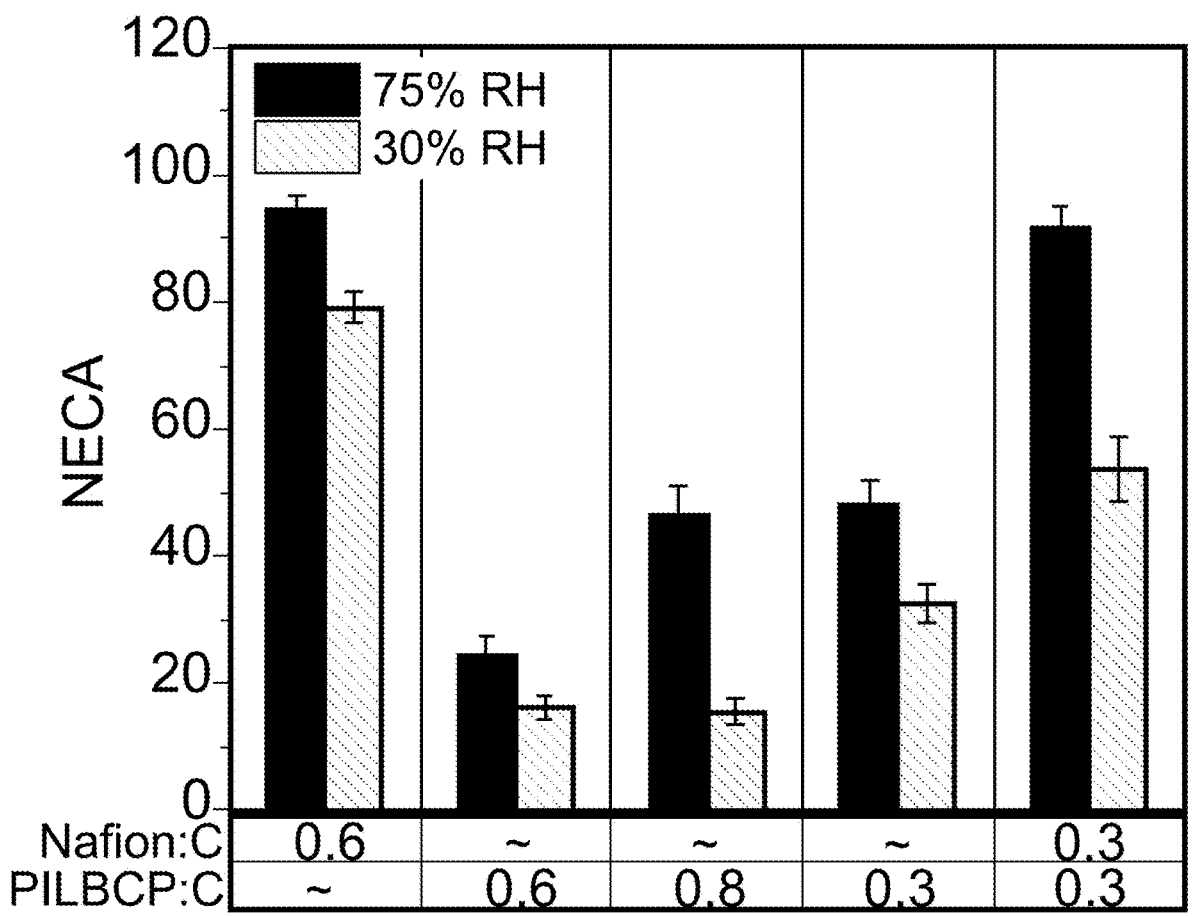
FIG. 3D illustrates the normalized ECA of fully conditioned Pt/Vu MEAs determined by CO stripping at ~80° C. and indicated RH, according to some embodiments of the present disclosure.
Figure 4A:
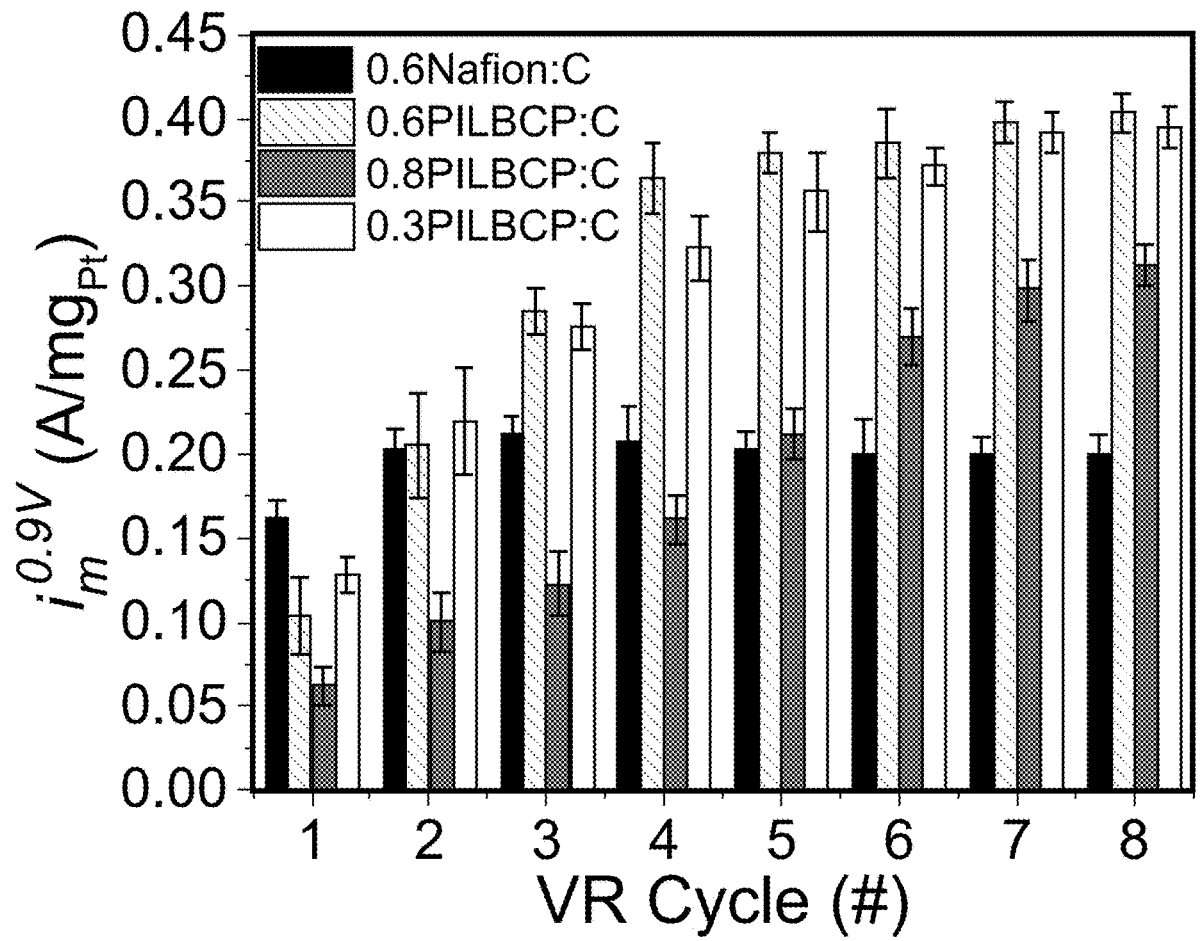
FIG. 4A illustrates the mass-based ($i_m^{0.9V}$) performance of Pt/Vu MEAs from $H_2/O_2$ performance at ~150 kPa, ~80° C., and 100% RH with indicated ionomer to carbon ratios, according to some embodiments of the present disclosure.
Figure 4B:
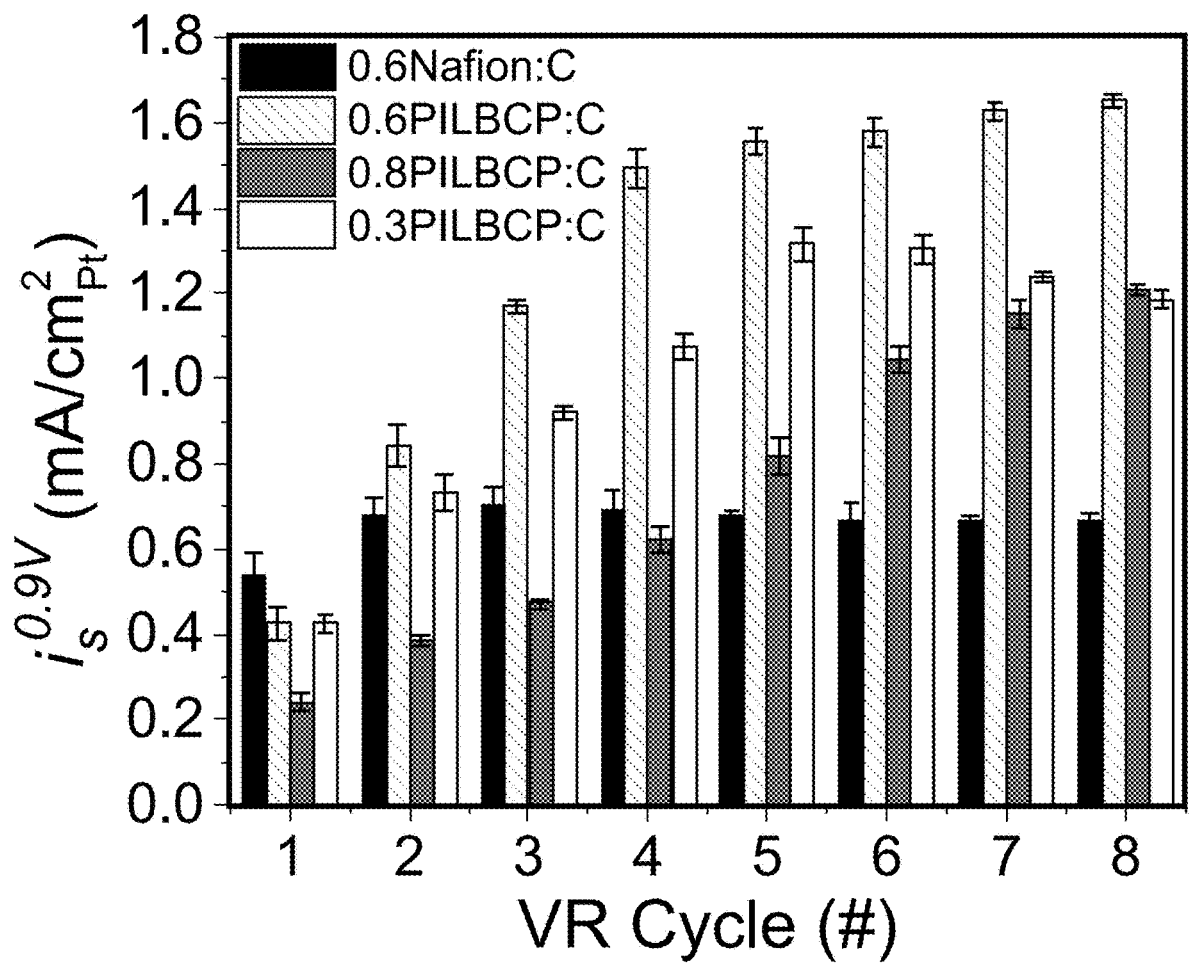
FIG. 4B illustrates the ECA-based ($i_s^{0.9V}$) performance of Pt/Vu MEAs from $H_2/O_2$ performance at ~150 kPa, ~80° C., and 100% RH with indicated ionomer to carbon ratios, according to some embodiments of the present disclosure.

Since $H_2/O_2$ polarization curves yield limited information on proton and, especially, gas transport-related losses, $H_2$/air polarization curves were collected at both high and low relative RH conditions (see FIGS. 3A and 3B, respectively). Additionally, to further evaluate the impact of SPILBCP and optimize MEA level performance, various loadings of the block copolymer ionomer were introduced. While the presence of SPILBCP promoted kinetic performance in all cases (see FIGS. 4A and 4B), neither higher loading (I/C=0.8) nor lower loading (I/C=0.3) of the SPILBCP improved the performance in $H_2$/air at 100% and ~30% RH. Experiments were performed on MEAs to evaluate the non-Fickian (pressure-independent) $O_2$ transport resistance ($R_{nF}$), which is inversely related to high current density (HCD) performance. FIG. 3C indicates SPILBCP-only samples have much higher $R_{nF}$ compared to Nafion-only MEA with similar loading, an effect which was amplified at low RH. Since $R_{nF}$ is dependent on Pt active site accessibility, changes in normalized ECA (NECA—so-called "dry proton accessibility") of fully conditioned MEAs could help explain the increased $R_{nF}$ at lower RHs. FIG. 3D indicates that the SPILBCP-only MEAs have much lower NECA (ECA from CO stripping at a given RH relative to total ECA measured at 100% RH) compared to Nafion-only MEAs. In fact, SPILBCP samples lose over 70% of their active area at RH=30%, much higher than the ~20% ECA loss typically observed in Pt/Vu-Nafion electrodes.

Typically, Vulcan supported Pt catalysts are able to retain the bulk of their ECA regardless of water content since the majority of Pt nanoparticles are located on the exterior of primary carbon particles. However, these primary particles often coalesce into aggregates or larger agglomerates with micro-/mesopores within the catalyst layer (CL). Unlike Nafion-containing MEAs that maintain facile proton transport, the complex chemical functionality of the SPILBCPs could mean that intramolecular interactions between side chains can limit the formation of well-connected proton pathways throughout the electrode, resulting in an exponential reduction in Pt utilization at low RH conditions. Furthermore, at low RH, the limited water uptake in SPILBCP may condense the ionomer into dry salt where the ionic mobility is significantly inhibited. Thus, at dry conditions, only the electrocatalysts next to relatively highly conductive Nafion membrane may be functioning due to poor ionic conductivity with pure SPILBCP (see FIG. 5). This appears to be the case as shown in FIG. 3B, where the performance of any MEA containing only SPILBCP drops nearly 200 mV at ~30% RH $H_2$/Air when compared to the Nafion containing samples. Since this voltage loss happens nearly at open circuit voltage, kinetically speaking, it would require three orders of magnitude reduction in Pt utilization, a value well beyond that obtained from simple CO stripping measurements as shown FIG. 3D. Consequently, it is desirable to simultaneously optimize: i) the electrocatalyst-ionomer interface to take advantage of beneficial Pt-oxide suppression, improving electrochemical kinetics and ii) CL microstructure to enable better Pt utilization at low RH, improving mass transport and proton conductivity by forming a highly connected ionomer network.

With the goal of maintaining the enhanced kinetic performance and overcoming the mass transport challenges characteristic of SPILBCP MEAs, both SPILBCP and Nafion ionomers were incorporated into catalyst layers to achieve a more optimal electrode structure. According to FIG. 3D, MEAs containing both Nafion and SPILBCP (with I/C of 0.3 SPILBCP:C+0.3Nafion:C) demonstrated significantly higher NECA values, even approaching those of Nafion-only MEAs, which led to reduced $R_{nF}$ values (see FIG. 3C) and greatly improved performance (see FIGS. 3A and 3B). This is clearly illustrated FIG. 3B, where the OCV of mixed Nafion/SPILBCP MEAs is on par with the Nafion-only MEA. At 30% RH, the enhanced kinetic activity for mixed Nafion/SPILBCP MEAs (ca. 2× vs Nafion only, see FIG. 1A) was offset by the reduced NECA, netting a similar polarization curve. However, for $H_2$/air polarization acquired at 100% RH (see FIG. 3A), where Pt ECA was nearly identical (see Table 2), the improved $i_m^{0.9V}$ (see FIG. 1A) and reduced $R_{nF}$ (see FIG. 3C) of the mixed Nafion/SPILBCP electrodes resulted in a substantial improvement in MEA performance across the kinetic and mass transport-limited regions.

TABLE 2

Average electrochemical active surface area (ECA) and roughness factor (RF) for MEA with Pt/Vu with loading of 0.07 mg$_{Pt}$ cm$^{-2}$ after 8 VRs.

| I:C | 0.6Nafion:C | 0.6PILBCP:C | 0.3SPILBCP:C + 0.3Nafion:C |
|---|---|---|---|
| avg. ECA (m$^2$ g$_{pt}^{-1}$) | 36.2 | 40.2 | 39.4 |
| avg. RF (m$^2$ m$_{pt}^{-2}$) | 24.98 | 27.60 | 27.55 |

Figure 5:
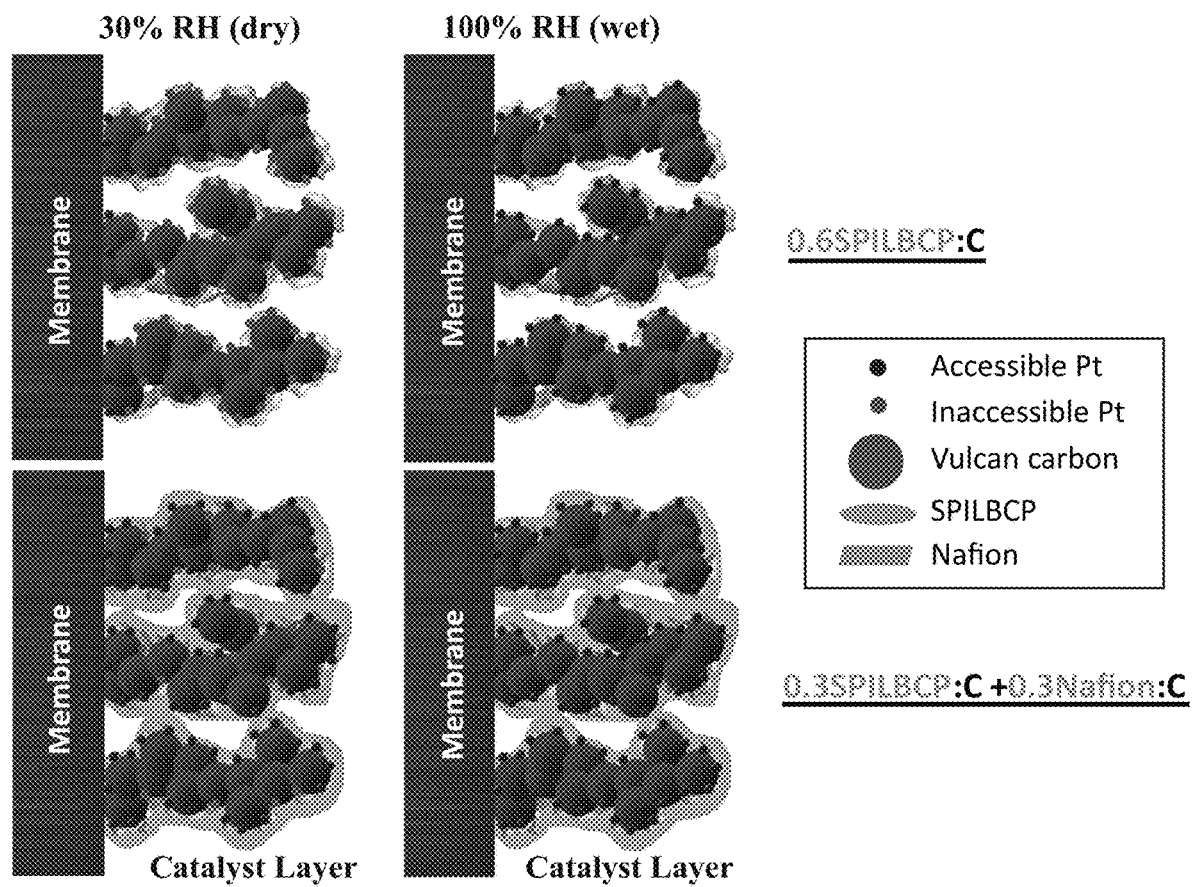
FIG. 5 illustrates a proposed microstructure of 0.6SPILBCP:C and 0.3 SPILBCP:C+0.3Nafion:C electrodes depicting the effect of ionomer distribution on Pt utilization under dry and wet operating conditions, according to some embodiments of the present disclosure. SPILBCP=sulfonated polymerized ionic liquid block copolymer.
Figure 6A:
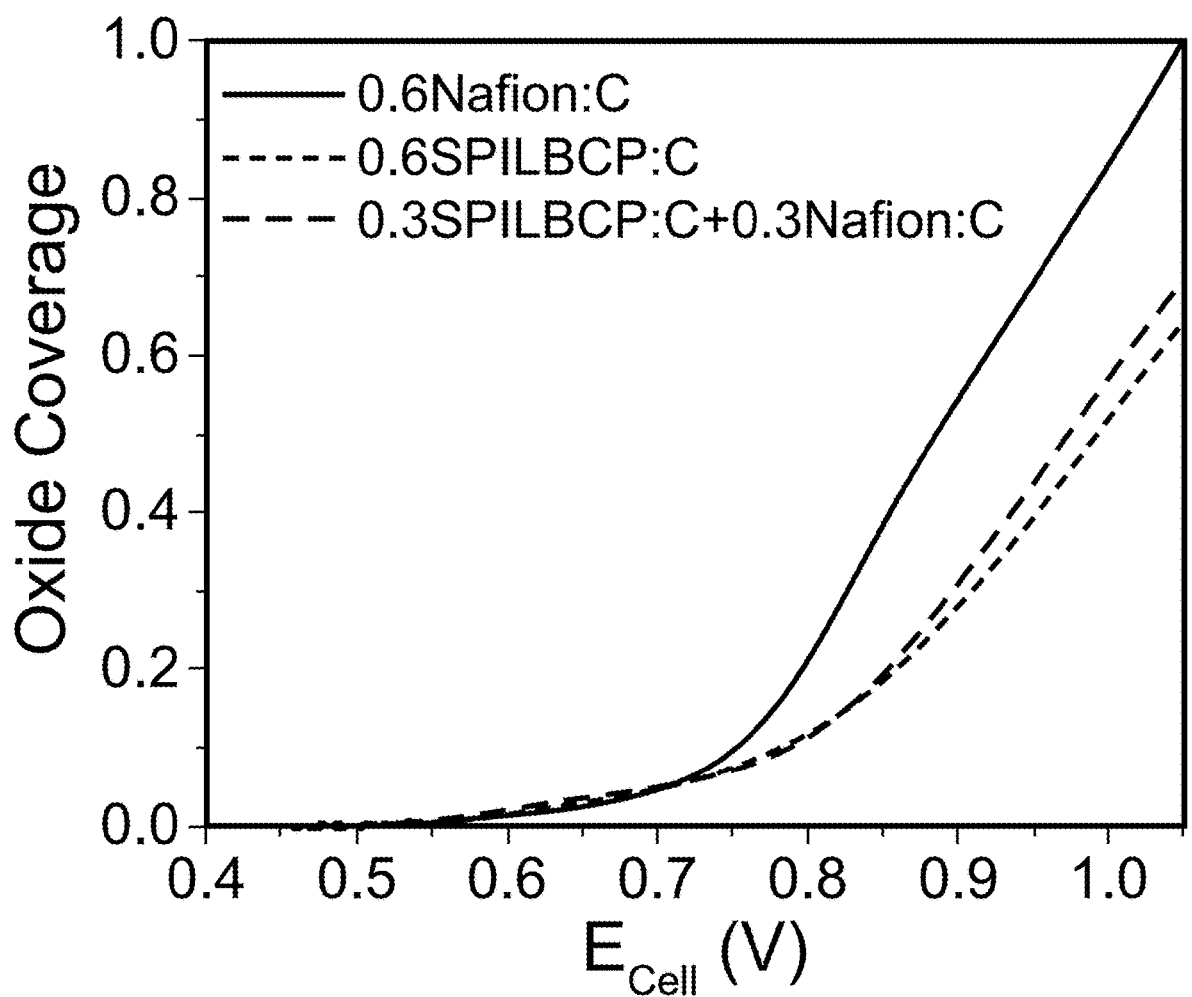
FIG. 6A illustrates oxide coverage of Pt/Vu with different ionomer network, according to some embodiments of the present disclosure.

From an electrode structural point of view illustrated in FIG. 5, Nafion helps to bridge vacancies between isolated SPILBCP aggregates, forming highly connected ionomer networks and facilitating proton transport in the CL, increasing Pt utilization. In addition, the reduced $R_{nF}$ values obtained for 0.3 SPILBCP:C+0.3Nafion:C compared to 0.6Nafion:C (see FIG. 3C) can be due to weaker polymer confinement effects with lower loading of Nafion. As discussed earlier and shown in FIGS. 1A and 1B, enhancements to $i_m^{0.9V}$ and $i_s^{0.9V}$ were preserved in mixed Nafion/SPILBCP MEAs, consistent with the continued suppression of Pt surface oxidation (see FIG. 1D). Accounting for metal loading and ECA, oxide coverage was calculated as a function of potential (see FIG. 6A) from data provided in FIG. 1D. These coverages were input into a kinetic model (see Equation 2) to predict the specific activity enhancements resulting from oxide suppression on 0.6SPILBCP:C and 0.3SPILBCP:C+0.3Nafion:C electrodes. From the model, both electrodes containing SPILBCP were predicted to show an approximate 2× enhancement in kinetic performance at 0.9V compared to 0.6Nafion:C electrodes, resulting from lower oxide coverage on these electrodes. This is in good agreement with the approximate 1.8× to 2.5× enhancements observed experimentally (see FIG. 1B) and presents a plausible explanation for the kinetic improvement of SPILBCP containing electrodes. Table 3 illustrates the elemental composition of the exemplary SPILBCP tested herein.

TABLE 3

Elemental Composition (wt. %) of SPILBCP

| ELEMENT | WT. % |
|---|---|
| C | 57.38 |
| H | 5.20 |

TABLE 3-continued

Elemental Composition (wt. %) of SPILBCP

| ELEMENT | WT. % |
|---|---|
| N | 4.12 |
| S | 9.47 |
| F | 8.44 |

Figure 9:
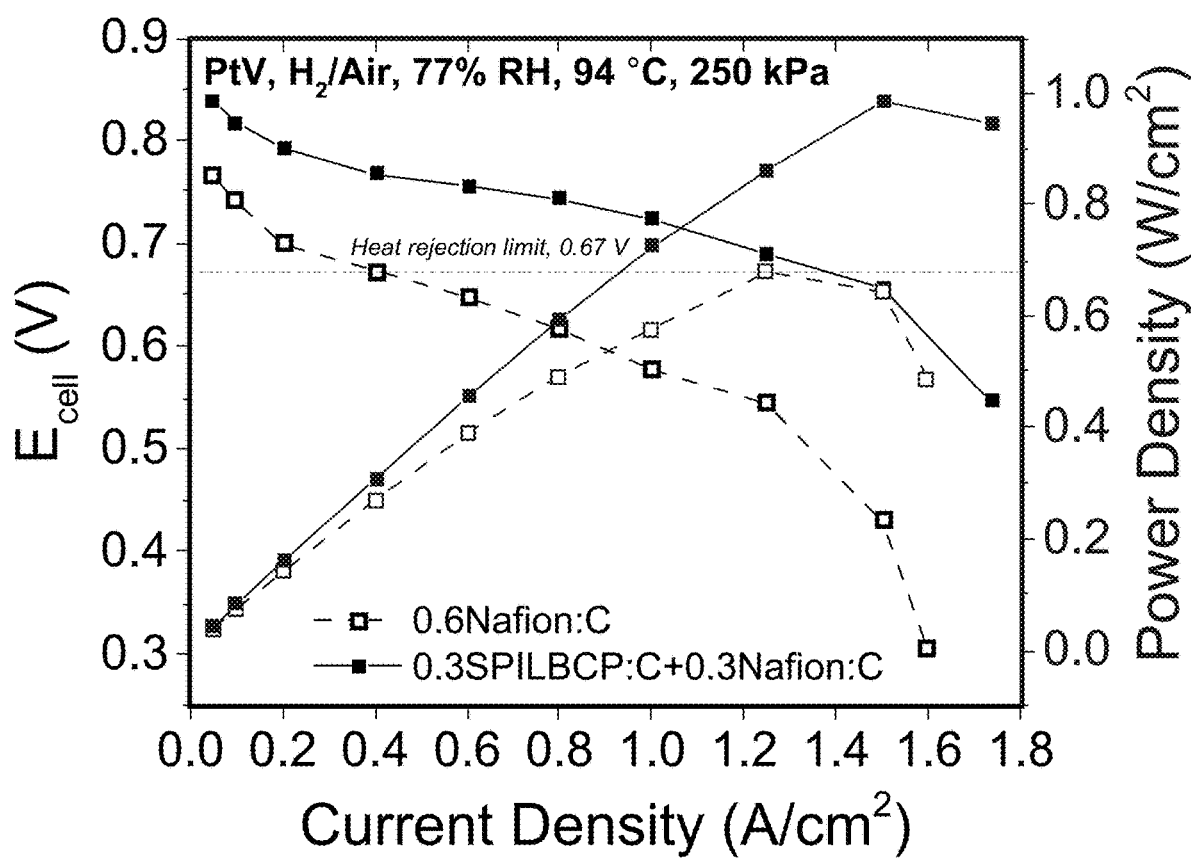
FIG. 9 illustrates the $H_2$/air performance of Pt/Vu MEAs, according to some embodiments of the present disclosure.
Figure 10A:
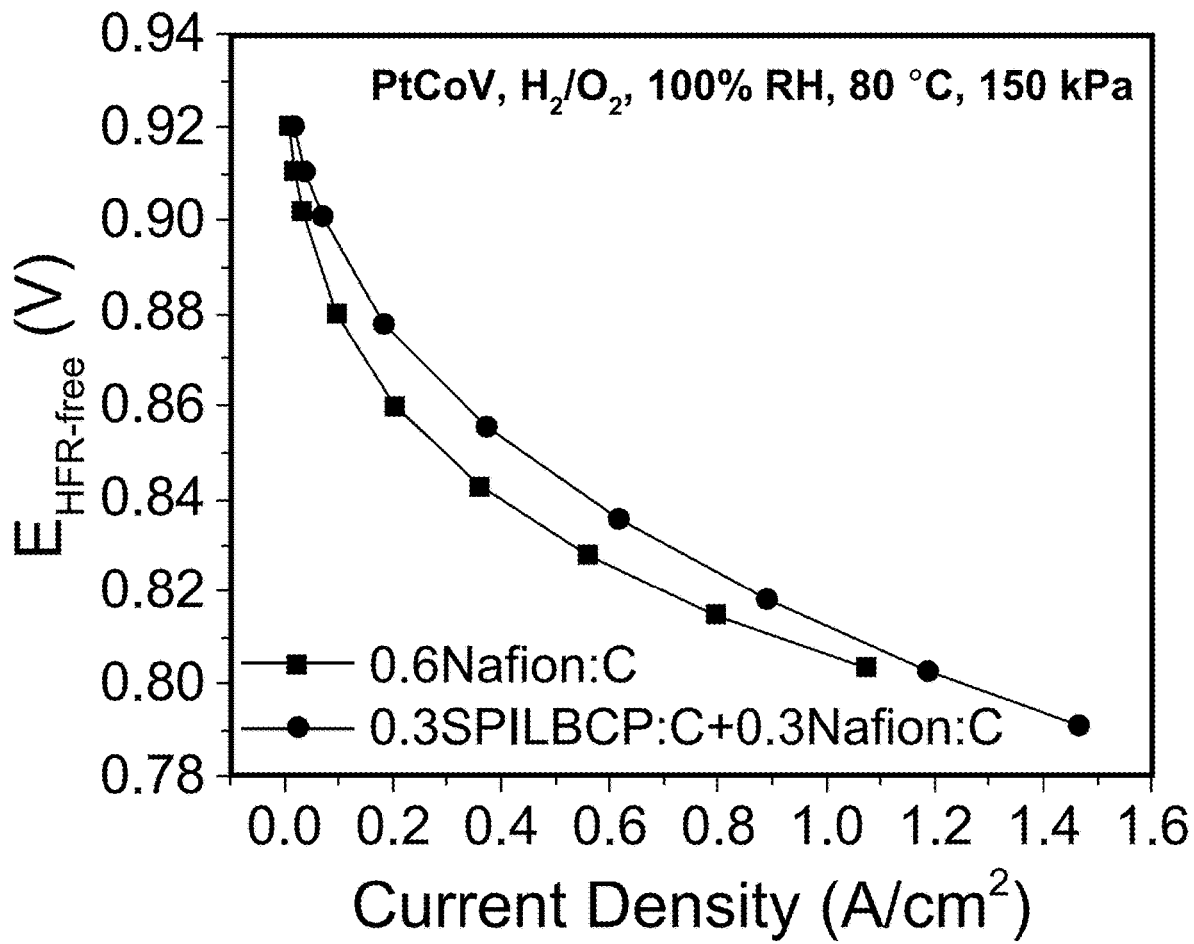
FIG. 10A illustrates the $H_2/O_2$ performance of PtCo alloy MEAs, according to some embodiments of the present disclosure.
Figure 10B:
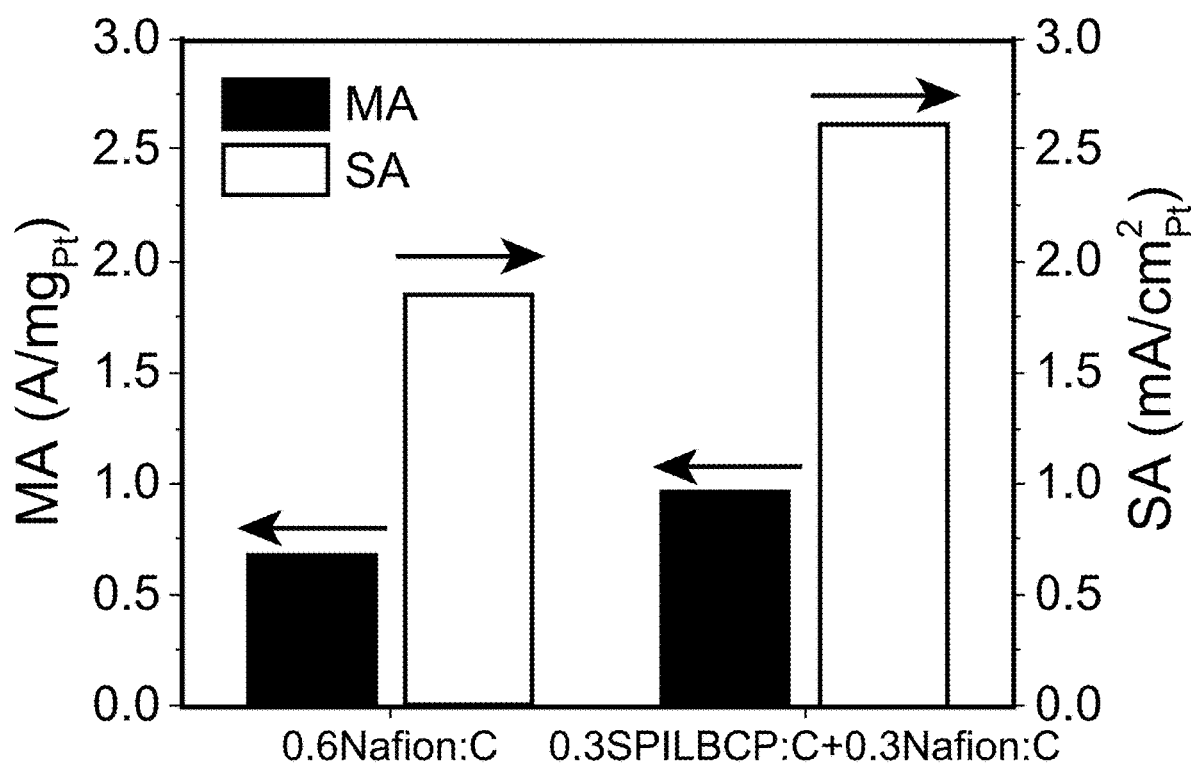
FIG. 10B illustrates the mass-based (MA) and electrochemical active surface area-based (SA) activity of fully conditioned PtCo/V MEAs, based on FIG. 10A results, according to some embodiments of the present disclosure.

FIG. 9 illustrates the $H_2$/air performance of Pt/Vu MEAs, according to some embodiments of the present disclosure. The test conditions were at about 77% RH, 94° C., and 250 kPa. This illustrates that an electrode using the combination of SPILBCIP and Nafion exhibited improved cell voltage ($E_{cell}$ (V)) and power density, relative to an electrode using Nafion alone. FIG. 10A illustrates the $H_2/O_2$ performance of PtCo alloy MEAs, according to some embodiments of the present disclosure. FIG. 10B illustrates the mass-based (MA) and electrochemical active surface area-based (SA) activity of fully conditioned PtCo/V MEAs, based on FIG. 10A results, according to some embodiments of the present disclosure. Both FIGS. 10A and 10B illustrate that an MEA with an electrode utilizing the combination of Nafion and SPILBCIP performs better than an MEA with an electrode using Nafion alone.

Experimental Methods:

Electrode Fabrication and Assembly: All catalyst coated membranes (CCM) were prepared using a similar catalyst ink formulation. Firstly, the ionomer (such as SPILBCP and Nafion D2020 Ion Power) was pre-dispersed in acetonitrile with desired ionomer-to-carbon ratio (I/C) prior to adding water. Next, 47.7 wt % Pt/Vu (TKK, TEC10V50E) was added into a mixture of ionomer, deionized water (DI) and acetonitrile. The catalyst suspensions were then dispersed with 20 seconds of horn sonication followed by 20 minutes of sonication in an ice-bath. The catalyst layer was ultrasonically sprayed onto Nafion NR211 membranes (Ion-Power) using a Sono-Tek spray station with 25 kHz Accumist nozzle at a target catalyst loadings of 0.07 mg$_{Pt}$/cm$^2$ for cathodes. Pt loadings on each individual electrode were verified by X-ray Fluorescence Spectroscopy (XRF) (Fisher XDV-SDD). Anode electrodes were prepared with PtCo/HSC (Umicore, Pt30 0670) dispersed in DI:n-PA (70 wt % water) with a I/C of 0.9 (Nafion:C mass ratio) and a 0.03 mg$_{Pt}$/cm$^2$ loading.

Once fabricated, the CCMs were assembled into either 50 cm$^2$ hardware for performance metrics measurements such as $H_2/O_2$ polarization data, $H_2$/Air polarization data, kinetic activities, and ECA, or 5 cm$^2$ differential cells for $O_2$ limiting current experiments. The CCMs were positioned between either two 50 cm$^2$ SGL 29 BC gas diffusion layers (GDLs) at 25% compression or 5 cm$^2$ Freudenberg GDLs at 18% compression. The CCMs, GDLs, and polytetrafluoroethylene (PTFE) gaskets were then placed between the flow fields and the bolts tightened to 40 inch-pounds.

In situ Electrochemical Diagnostics: A customized Hydrogenics test station was used to perform all fuel cell testing. All the MEAS tested in this work were subjected to an established conditioning protocol consisting of an initial break-in procedure that activates the cell and a series of voltage recovery steps which were followed by polarization measurements.

Break-in. The break-in procedures begin by heating the cell to 80° C., and holding the cell at an open circuit potential (load equivalent flow rates of 0.8/2.5=$H_2$/Air Lstd/min), followed by a series of 5/10/5 voltage cycles in the fuel cell regime of 0.60 V-0.90 V for 4 minutes.

Voltage Recovery (VR). The voltage recovery (VR) step exposed the cell at 0.1 Vcell under H₂/Air (950/500 sccm respectively) for two hours at 40° C. and 150% RH.

H₂/O₂ Polarization Curves. The test protocol involved measuring the I-V curves from 0.4 V to OCV at ~80° C. at 100 kPa O₂ partial pressure (150 kPa total pressure) and 100% RH for four minutes per point (average of the last minute used) in the anodic direction. The oxygen reduction reaction (ORR) mass activities were reported at 0.90 V after applying high frequency resistance (HFR) and hydrogen cross-over corrections.

H₂/Air Polarization Curves. The test protocol involved measuring the I-V curves from 0.3 V to OCV at 80° C. and at 150 kPa total pressure with 75% RH for four minutes per point (average of last minute used) in the anodic direction.

CO Stripping Voltammetry. Pt electrochemical surface area (ECA) was determined by integrating the CO stripping charge (QCO) obtained from cyclic voltammetry (CV) after the introduction of CO to an equilibrated electrode held at 0.2 Vcell. The cathode feed was purged with pure N₂ at 0.25 Lstd/min prior to the first anodic sweep. CVs were performed immediately at 80° C. and different RH under H₂/N₂ sweeping from 0.05 to 0.9 V at 20 mV/s. 420 μC/cm² was assumed as the unit charge for CO integrated areas in determining the ECA.

O₂ Limiting Current Experiments. Limiting current measurements were performed at 80° C. and 75/30% RH, with 0.02, 0.03 and 0.05 mole fraction of oxygen. The limiting current was obtained at total cell pressures of 100, 150, 200 and 300 kPa. Limiting current was measured at constant voltages of 0.30, 0.24, 0.18, 0.12, and 0.06 V and held for three minutes. Due to the impact of hydrogen evolution on current densities obtained below 0.1 V, the maximum of the resulting current densities above 0.12 V was reported as the limiting current.

Dynamic Light Scattering (DLS) for Ink Characterization. The DLS measurements were performed using Zetasizer Nano ZS (Malvern Instruments Ltd, Malvern, U.K.). These measurements were performed on relatively dilute inks compared to inks used for MEA fabrication at 0.1 wt % Pt/Vu as desired by the technique to avoid multiple scattering. And the DLS measurements of ionomer solutions were carried out at 0.024 wt % using a disposable cuvette cell. At least five measurements were taken to ensure repeatability of the results.

Figure 6B:
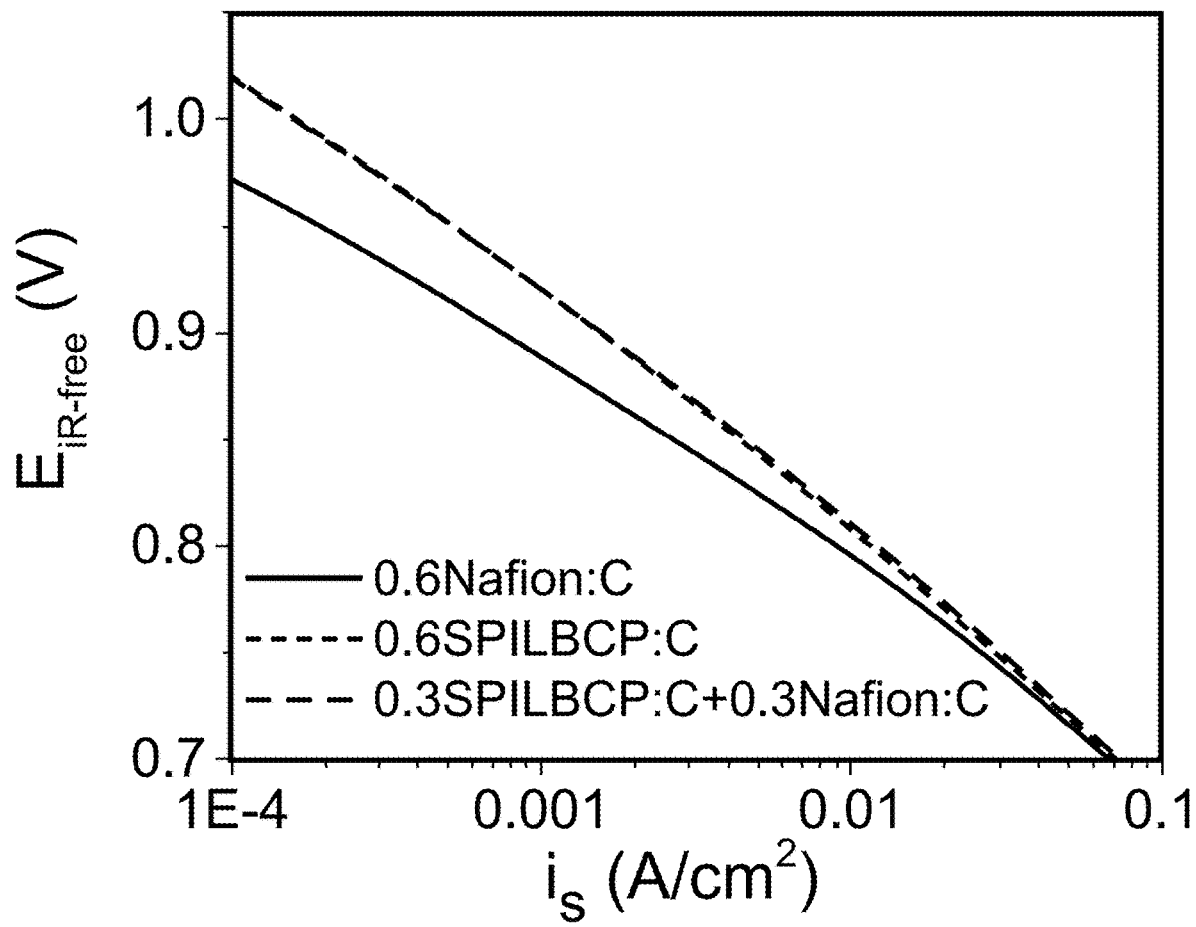
FIG. 6B illustrates coverage-dependent kinetics of Pt/Vu with different ionomer network, according to some embodiments of the present disclosure.
Figure 7:
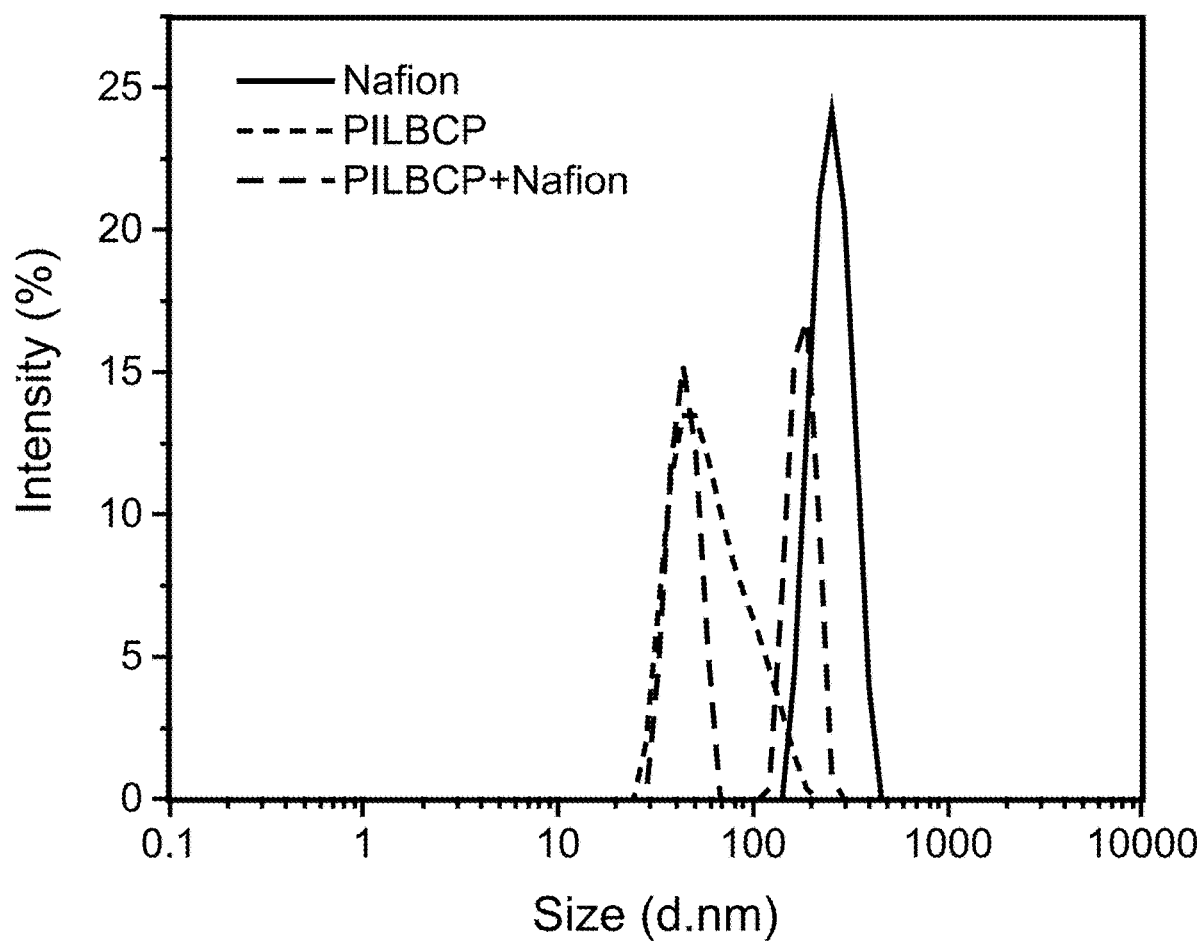
FIG. 7 illustrates particle size distribution of dilute (~0.024 wt %) ionomer dispersions in the solvent of ~60 wt % water and ~40 wt % acetonitrile characterized by dynamic lighting scattering (DLS), according to some embodiments of the present disclosure.

Oxide Coverage and Kinetic Model Calculations. In this study, the anodic sweep of cyclic voltammetry experiments (see FIG. 1D) was used to measure surface oxidization of Pt/Vu electrodes, which occurred between 0.45 and 1.05$V_{cell}$. All spectra were first corrected by a background current measured at 0.45V to eliminate contributions from H₂ crossover. Slight differences in metal loading and electrochemical surface area were corrected by scaling the background corrected currents accordingly. These corrected spectra were then integrated from 0.45V to each measured potential until the upper bound of 1.05V was reached. These charges were then normalized by the total oxidization charge observed on the 0.6Nafion:C Pt/Vu electrode between 0.45 and 1.05$V_{cell}$, to yield a fractional oxide coverage as a function of cell potential (see FIG. 6A) using Equation 1. The coverage values were directly applied in a model (see Equation 2) to predict coverage-dependent ORR kinetics displayed in FIG. 6B.

Note, this treatment does not account for differences in local O₂ concentration or permeability, which might result from PILBCP integration. Overall, it was observed that the mixed ionomer MEAs exhibited better performance than any individual component analogues.

Oxide Coverage Calculation $$\Theta_{PtO_x}(V) = \frac{\int_{0.45}^{V} \tilde{\imath}(V')dV'}{Q_{PtO_x,Nafion}} = \frac{\int_{0.45}^{V} \tilde{\imath}(V')dV'}{\int_{0.45}^{1.05} \tilde{\imath}_{Nafion}(V')dV'} \quad \text{Equation 1}$$

Figure 8:
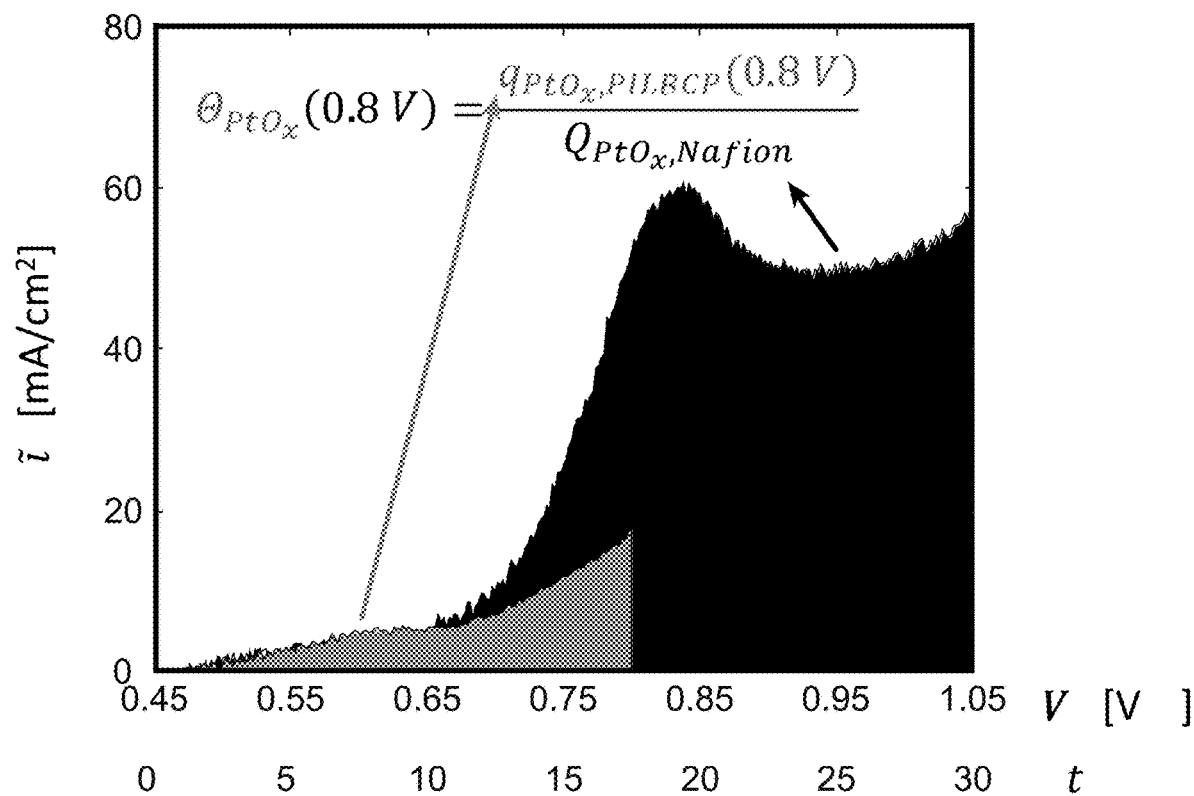
FIG. 8 illustrates integration of normalized CV data to calculate oxide coverage on 0.6SPILBCP:C MEA at ~0.8 Vcell, according to some embodiments of the present disclosure. The red and black regions correspond to the cumulative oxidation charge experience on 0.6SPILBCP:C to 0.80V and 0.6Nafion:C electrodes to ~1.05V, respectively.

$\Theta_{PtO_x}$, V, and $\tilde{\imath}$, represents the oxide coverage, cell voltage, and normalized oxidization current measured on different MEAs, and $Q_{PtO_x,Nafion}$ corresponds to the total oxidization charge observed on the 0.6Nafion:C Pt/Vu electrode evaluated between 0.45 and 1.05V. FIG. 8 graphically represents how oxide coverage was calculated.

ORR Kinetics Model Parameters and Calculation

ORR kinetics measured as current density (i) depends on many experimental variables such as the operating conditions (O₂ partial pressure $p_{o2}$, temperature T, cathodic overpotential η), the intrinsic properties of catalytic sites (exchange current density $i_0$, oxide/adsorbate coverage θ), and parameters related to the reaction mechanism (reaction order w.r.t O₂ γ, charge transfer coefficient α, coverage dependent adsorption energetics ω). R and F correspond to the universal gas constant and Faraday constant, respectively. See Table 4 below for parameter values.

$$i = i_0 \left(\frac{p_{02}}{p_{02,ref}}\right)^{\gamma} (1-\theta)\exp\left(\frac{-\alpha F \eta}{RT}\right)\exp\left(-\frac{\omega \theta}{RT}\right) \quad \text{Equation 2}$$

TABLE 4

Model Parameter Values

| PARAMETERS | COVERAGE-DEPENDENT ORR MODEL |
|---|---|
| α | 0.5 |
| γ | 0.7 ± 0.08 |
| ω, J | 3.0 × 10³ |
| $i_0$, A/cm$_{Pt}^2$ | 3.0 × 10⁻⁵ |

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A composition comprising:
   a fluoropolymer;
   a polymerized ionic liquid block copolymer; and
   a catalyst, wherein:
   the fluoropolymer is configured to affect ionic mobility, and
   the polymerized ionic liquid block copolymer is configured to affect a property of the catalyst.

2. The composition of claim 1, wherein the property comprises at least one of oxygen transport or an active site functionality of the catalyst.

3. The composition of claim 1, wherein the fluoropolymer comprises at least one of polyvinylfluoride, polyvinylidene fluoride, polytetrafluoroethylene, polychlorotrifluoroethylene, a perfluoroalkoxy polymer, fluorinated ethylene-propylene, polyethylenetetrafluoroethylene, polyethylenechlorotrifluoroethylene, chlorotrifluoroethylenevinylidene fluoride, tetrafluoroethylene-propylene, perfluoropolyether, or perfluorosulfonic acid.

4. The composition of claim 1, wherein:
   the fluoropolymer has the structure

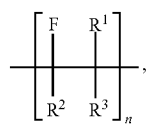

each of $R^1$, $R^2$, and $R^3$ comprises at least one of a hydrogen atom, a fluorine atom, a trifluoromethyl group, or a sulfonic acid group, and
   $1<n<10,000$.

5. The composition of claim 1, wherein:
   the fluoropolymer comprises at least one of

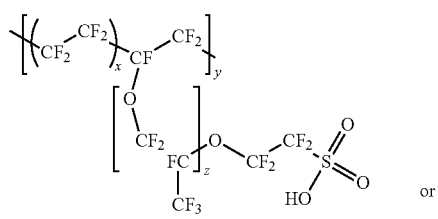

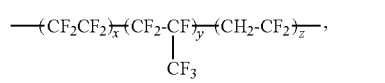

$1<x<10,000$, $1<y<10,000$, and $1<z<10,000$.

6. The composition of claim 1, wherein:
   the polymerized ionic liquid block copolymer comprises at least one of a first repeat unit or a second repeat unit,
   the first repeat unit is defined by

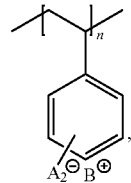

the second repeat unit is defined by

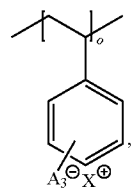

$A_2$ is a first ionic functional group paired with a first counter ion ($B^+$),
   $A_3$ is a second ionic functional group paired with a second counter ion ($X^-$),
   $1 \le n \le 1,000$ and $1 \le o \le 1,000$.

7. The composition of claim 6, wherein:
   the polymerized ionic liquid block copolymer further comprises a third repeat unit defined by

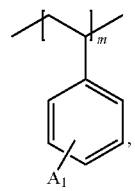

$A_1$ is a neutral functional group,
   the neutral functional group comprises at least one of a hydrocarbon chain or an aromatic, and
   $1 \le m \le 1,000$.

8. The composition of claim 6, wherein $A_2^-$ comprises a sulfonic group ($-SO_3^-$).

9. The composition of claim 6, wherein $B^+$ comprises a Group I element.

10. The composition of claim 9, wherein $B^+$ comprises at least one of $H^+$ or $Li^+$.

11. The composition of claim 6, wherein $A_3$ comprises a nitrogen atom.

12. The composition of claim 11, wherein $A_3^+$ comprises at least one of

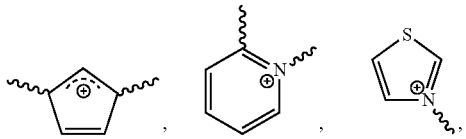

-continued

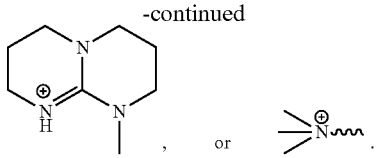

13. The composition of claim 11, wherein $A_3^+$ comprises at least one of

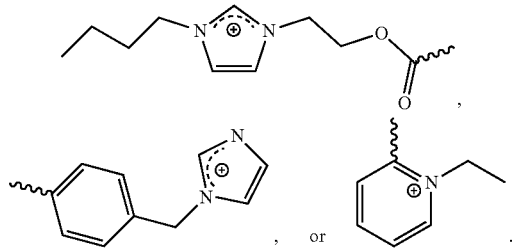

14. The composition of claim 6, wherein:
$X^-$ comprises at least one of

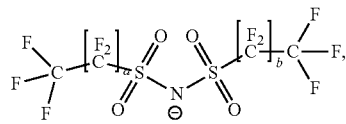

$CF_3CF_2CF_2CF_2SO_3^\ominus$,

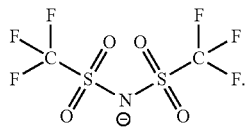

$BF_4^-$, or $PF_6^-$,
$1 \leq a \leq 10$ and $1 \leq a \leq 10$.

15. The composition of claim 14, wherein $X^-$ comprises (TFSI)

16. The composition of claim 1, wherein the polymerized ionic liquid block copolymer comprises at least one of

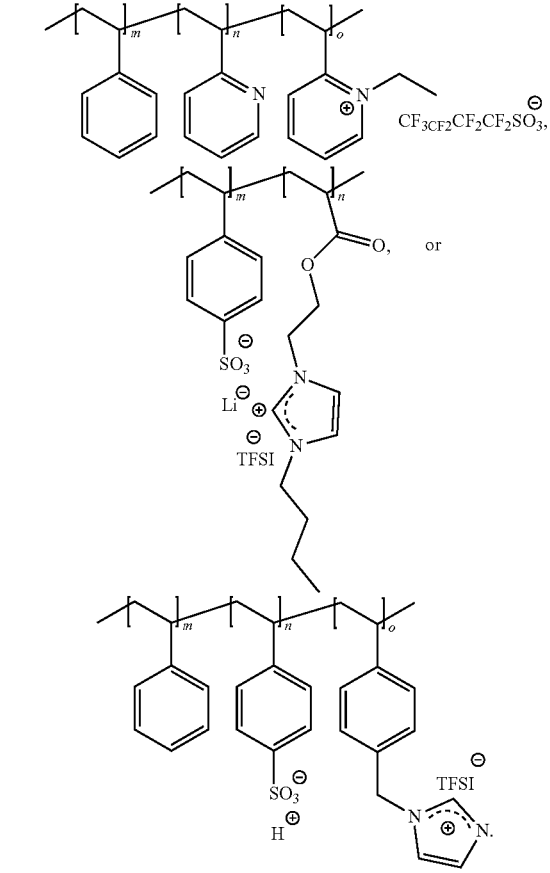

17. The composition of claim 1, further comprising a conductive carbon.

18. The composition of claim 17, wherein the conductive carbon comprises at least one of carbon black, acetylene black, graphite, or oxidized acetylene black.

19. The composition of claim 1, wherein the fluoropolymer and the polymerized ionic liquid block copolymer are present at a first mass ratio between 1:10 and 10:1.

20. The composition of claim 1, wherein the fluoropolymer and the catalyst are present at a second mass ratio between 1:10 and 20:1.

21. The composition of claim 17, wherein the fluoropolymer and the conductive carbon are present at a third mass ratio between 1:10 and 1:1.

* * * * *